(12) United States Patent
Lehoux-Lebacque et al.

(10) Patent No.: US 12,123,725 B2
(45) Date of Patent: Oct. 22, 2024

(54) METHOD FOR COMPUTING A PERSONALIZED ITINERARY FROM A DEPARTURE LOCATION TO AN ARRIVAL LOCATION

(71) Applicant: Naver Corporation, Seongnam-si (KR)

(72) Inventors: Vassilissa Lehoux-Lebacque, Corenc (FR); Christelle Loiodice, La Tronche (FR)

(73) Assignee: Naver Corporation (KR)

( * ) Notice: Subject to any disclaimer, the term of this patent is extended or adjusted under 35 U.S.C. 154(b) by 213 days.

(21) Appl. No.: 17/335,402

(22) Filed: Jun. 1, 2021

(65) Prior Publication Data

US 2022/0057217 A1     Feb. 24, 2022

Related U.S. Application Data

(60) Provisional application No. 63/068,581, filed on Aug. 21, 2020.

(51) Int. Cl.
*G01C 21/34*           (2006.01)

(52) U.S. Cl.
CPC ....... *G01C 21/343* (2013.01); *G01C 21/3423* (2013.01); *G01C 21/3446* (2013.01)

(58) Field of Classification Search
CPC .......... G08G 1/123; G08G 1/127; G08G 1/00; G08G 1/0125; G08G 1/202; G08G 1/20; G08G 1/0112; G08G 1/0133; G08G 1/0129; G08G 1/005; G08G 1/0104; G08G 1/0116; G08G 1/096725; G01C 21/36; G01C 21/3415; G01C 21/3655; G01C 21/3492; G01C 21/3423; G01C 21/005;

(Continued)

(56) References Cited

U.S. PATENT DOCUMENTS

| | | | |
|---|---|---|---|
| 5,991,688 A | 11/1999 | Fukushima et al. | |
| 6,779,060 B1 | 8/2004 | Azvine et al. | |

(Continued)

FOREIGN PATENT DOCUMENTS

| | | |
|---|---|---|
| EP | 3339806 A1 | 6/2018 |
| JP | 2007520685 | 7/2007 |

(Continued)

OTHER PUBLICATIONS

Artigues, Christian, Marie-josé Huguet, Fallou Gueye, Frederic Schettini, and Laurent Dezou. State-Based Accelerations and Bidirectional Search for Bi-Objective Multi-Modal Shortest Paths, 2013. 2013.

(Continued)

*Primary Examiner* — Jonathan L Sample
*Assistant Examiner* — Sagar Kc
(74) *Attorney, Agent, or Firm* — Michael J. Nickerson; Dawson Law Firm, P.C.

(57) ABSTRACT

A method extends the Trip Based Public Transit Routing algorithm to compute personalized itineraries in a multi-modal network based on custom transfer speed and maximum transfer duration. The customization is done at query time. The method modifies the pruning phase and the search phase of the Trip Based Public Transit Routing algorithm to obtain Pareto front for minimizing arrival time and number of transfers, along with one optimal solution per value in the Pareto front.

31 Claims, 15 Drawing Sheets

(58) Field of Classification Search
CPC ............... G01C 21/34; G01C 21/3667; G01C 21/3691; G01C 21/367; G01C 21/3446; G01C 21/20; G01C 21/343
See application file for complete search history.

(56) References Cited

U.S. PATENT DOCUMENTS

| | | | |
|---|---|---|---|
| 6,785,608 | B1 | 8/2004 | Milici et al. |
| 8,417,409 | B2 | 4/2013 | Bast et al. |
| 8,494,771 | B2 | 7/2013 | Delling et al. |
| 2002/0059025 | A1 | 5/2002 | Kim et al. |
| 2004/0218536 | A1 | 11/2004 | Yasukawa et al. |
| 2005/0043884 | A1 | 2/2005 | Atarashi |
| 2007/0008949 | A1 | 1/2007 | Balandin |
| 2008/0075007 | A1 | 3/2008 | Mehta et al. |
| 2010/0036606 | A1 | 2/2010 | Jones |
| 2010/0082245 | A1 | 4/2010 | Patenaude et al. |
| 2010/0228574 | A1 | 9/2010 | Mundinger et al. |
| 2010/0280853 | A1 | 11/2010 | Petralia et al. |
| 2010/0305984 | A1 | 12/2010 | Ben-Yitschak et al. |
| 2011/0112759 | A1* | 5/2011 | Bast ............... G01C 21/3423 701/533 |
| 2011/0125666 | A1 | 5/2011 | Laurent et al. |
| 2013/0204525 | A1* | 8/2013 | Pfeifle ............. G01C 21/3469 701/400 |
| 2014/0257697 | A1 | 9/2014 | Gishen |
| 2014/0343974 | A1 | 11/2014 | Graells et al. |
| 2015/0371157 | A1 | 12/2015 | Jaffe |
| 2016/0203422 | A1 | 7/2016 | Demarchi et al. |

FOREIGN PATENT DOCUMENTS

| | | |
|---|---|---|
| JP | 2013511095 | 3/2013 |
| JP | 2014032139 A | 2/2014 |
| JP | 2016045020 | 4/2016 |
| JP | 2017075967 A | 4/2017 |
| JP | 2018109621 A | 7/2018 |
| WO | 2005013234 A1 | 2/2005 |
| WO | WO2008142783 A1 | 11/2008 |

OTHER PUBLICATIONS

Barrett, Chris, Riko Jacob, and Madhav Marathe. 'Formal-Language-Constrained Path Problems'. SIAM Journal on Computing 30 (2000): 200-0. 2000.
Bast, Hannah, Mirko Brodesser, and Sabine Stor. 'Result Diversity for Multi-Modal Route Planning'. In 13th Workshop on Algorithmic Approaches for Transportation Modelling, Optimization, and Systems, vol. 33 of OpenAccess Series in Informatics (OASIcs), pp. 123-136, Dagstuhl, 2013. 2013.
Bast, Hannah, Erik Carlsson, Arno Eigenwillig, Robert Geisberger, Chris Harrelson, Veselin Raychev, and Fabien Viger. 'Fast Routing in Very Large Public Transportation Networks Using Transfer Patterns'. In In Proceedings of the 18th Annual European Conference on Algorithms: Part I, ESA'10, 290-301. Springer-Verlag, 2010. 2010.
Bast, Hannah, Daniel Delling, Andrew V. Goldberg, Matthias Müllerhannemann, Thomas Pajor, Peter Sanders, Dorothea Wagner, and Renato F. Werneck. 'Route Planning in Transportation Networks', 2014. 2014.
Delling, Daniel, Julian Dibbelt, Thomas Pajor, Dorothea Wagner, and Renato F. Werneck. Computing Multimodal Journeys in Practice?, n.d. 2018.
Daniel Delling, Thomas Pajor, and Renato F. Werneck. Round-based public transit routing. In Proceedings of the Fourteenth Workshop on Algorithm Engineering and Experiments (ALENEX), 2013. 2013.
Dibbelt, Julian, Thomas Pajor, Ben Strasser, and Dorothea Wagner. 'Intriguingly Simple and Fast Transit Routing'. In In SEA, vol. 7933 of LNCS, 43-54. Springer, 2013. 2013.
Julian Dibbelt, Thomas Pajor, and Dorothea Wagner. User-constrained multi-modal route plan-ning. In SIAM, editor, Proceedings of the 14th Meeting on Algorithm Engineering and Experiments (ALENEX12), p. 118129, 2012 2012.
Garey M. R. and D. S. Johnson. Computers and intractability: A guide to the theory of NP-completeness. Freeman, 1979. 1979.
Geisberger, Robert, Peter Sanders, Dominik Schultes, and Daniel Delling. 'Contraction Hierarchies: Faster and Simpler Hierarchical Routing in Road Networks'. In Experimental Algorithms, edited by Catherine C. McGeoch, 5038:319-33. Berlin, Heidelberg: Springer Berlin Heidelberg, 2008. https://doi.org/10.1007/978-3-540-68552-4_24. 2008.
Goldberg, Andrew V., and Chris Harrelson. 'Computing the Shortest Path: A Search Meets Graph Theory'. In Proceedings of the Sixteenth Annual ACM-SIAM Symposium on Discrete Algorithms, 156-165. SODA '05. Vancouver, British Columbia: Society for Industrial and Applied Mathematics, 2005 2005.
Hansen, Pierre. 'Bicriterion Path Problems'. In Multiple Criteria Decision Making Theory and Application, edited by Günter Fandel and Tomas Gal, 177:109-27. Berlin, Heidelberg: Springer Berlin Heidelberg, 1980. https://doi. org/10.1007/978-3-642-48782-8_9. 1980.
Idri, Abdelfattah, Mariyem Oukarfi, Azedine Boulmakoul, Karine Zeitouni, and Ali Masri. 'A Distributed Approach for Shortest Path Algorithm in Dynamic Multimodal Transportation Networks'. Transportation Research Procedia 27 (2017): 294-300. https://doi.org/10.1016/j.trpro.2017.12.094. 2017.
Kirchler, Dominik. 'Efficient Routing on Multi-Modal Transportation Networks'. Phdthesis, Ecole Polytechnique X, 2013. https://pastel.archives-ouvertes.fr/pastel-00877450. 2013.
Liu, Lu, and Liqiu Meng. 'Algorithms of Multi-Modal Route Planning Based on the Concept of Switch Point'. Photogrammetrie—Fernerkundung—Geoinformation 2009, No. 5 (Nov. 1, 2009): 431-44. https://doi.org/10.1127/1432-8364/2009/0031. 2009.
Liu, Xudong, Christian Fritz, and Matthew Klenk. 'On Extensibility and Personalizability of Multi-Modal Trip Planning', n.d., 7. 2018.
Ulloa Luis, Lehoux Vassilissa, Roulland Frederic. Trip planning within a multimodal urban mobility, IET Intelligent Transport Systems, 12(2):87-92, 2018. 2018.
Witt, Sascha. 'Trip-Based Public Transit Routing'. ArXiv:1504.07149 [Cs] 9294 (2015): 1025-36. https://doi.org/10.1007/978-3-662-48350-3_85. 2015.
Witt, Sascha. Trip-based public transit routing using condensed search trees. In Marc Goerigk and Renato Werneck, editors, 16th Workshop on Algorithmic Approaches for Transporation Modelling, Optimization, and Systems (ATMOS16), No. 10, 2016. 2016.
Bast, Hannah, Daniel Delling, Andrew Goldberg, Matthias Müller-Hannemann, Thomas Pajor, Peter Sanders, Dorothea Wagner, and Renato F. Werneck. 'Route Planning in Transportation Networks'. ArXiv: 1504.05140 [Cs], Apr. 20, 2015. http://arxiv.org/abs/1504.05140. 2015.
Web page: https://data.grandlyon.com/ Home • Métropolitan Data of the Grand Lyon.Pdf', n.d. 2018.
Web page : https://opendata.stif.info. 'Home page—Portail Open Data Île-de-france Mobilités—Open Data Île-de- France Mobilités. Pdf', n.d. 2018.
"General transit feed standard format reference documentation," https://developers.google.com/transit/gtfs/reference/2018.
E. Cohen, E. Halperin, H. Kaplan, and U. Zwick. Reachability and distance queries via 2-hop labels. SIAM Journal on Computing, 32(5):13381355, 2003 2003.
Julian Dibbelt, Thomas Pajor, and Renato F. Werneck. Public transit labeling. In Bampis E., editor, Experimental Algorithms SEA 2015, vol. 9125 of Lecture Notes in Computer Science. Springer, 2015 2015.
Matthias Hertel Hannah Bast and Sabine Storandt. Scalable transfer patterns. In Proceedings of the Eighteenth Workshop on Algorithm Engineering and Experiments (ALENEX), 2016 2016.
Hannah Bast, Mirko Brodesser, and Sabine Storandt. Result Diversity for Multi-Modal Route Plan-ning. In Daniele Frigioni and Sebastian Stiller, editors, 13th Workshop on Algorithmic Approaches for Transportation Modelling, Optimization, and Systems, vol. 33 of

(56) References Cited

OTHER PUBLICATIONS

OpenAccess Series in Infor¬matics (OASIcs), pp. 123-136, Dagstuhl, Germany, 2013. Schloss Dagstuhl—Leibniz-Zentrum fuer Informatik 2013.

Moritz Baum, Valentin Buchhold, Jonas Sauer, Dorothea Wagner, and Tobias Zündorf. Unlimited transfers for multi-modal route planning: An efficient solution. In Proceedings of ESA 2019, to appear, 2019 2019.

Vassilissa Lehoux and Darko Drakulic. Mode Personalization in Trip-Based Transit Routing. In Gianlorenzo D'Angelo and Twan Dollevoet, editors, 19th Workshop on Algorithmic Approaches for Transportation Modelling, Optimization, and Systems (ATMOS 2019), vol. 75 of OpenAccess Series in Informatics (OASIcs), Dagstuhl, Germany, 2019. Schloss Dagstuhl-Leibniz-Zentrum fuer Informatik 2019.

IÔle De France Mobilités. Open data. https://www.iledefrance-mobilites.fr 2018.

Duc-Minh Phan and Laurent Viennot. Fast public transitrouting with unrestrict-edwalking through hub labeling. In Proceedings of the Special Event on Analysis of Experimental Algorithms (SEA2), Lecture Notes in Computer Science. Springer, 2019. 2019.

Dorothea Wagner and Tobias Zundorf. Public Transit Routing with Unrestricted Walking. In Gianlorenzo D'Angelo and Twan Dollevoet, editors, 17th Workshop on Algorithmic Approaches for Transportation Modelling, Optimization, and Systems (ATMOS 2017), vol. 59 of OpenAccess Series in Informatics (OASIcs), p. 7:1-7:14, Dagstuhl, Germany, 2017. Schloss Dagstuhl—Leibniz-Zentrum fuer Informatik. 2017.

U.S. Appl. No. 16/830,609, filed Mar. 26, 2020, entitled, "Methods for Preprocessing a Set of Feasible Transfers for Computing Itineraries in a Multimodal Transportation Network" 2020.

U.S. Appl. No. 16/830,621, filed Mar. 26, 2020, entitled, "Method for Preprocessing a Set of Non-Scheduled Lines Within a Multimodal Transportation Network of Predetermined Stations and for Computing at Least One Itinerary From a Departure Location to an Arrival Location" 2020.

U.S. Appl. No. 16/700,096, filed Dec. 2, 2019, entitled, "Method for Computing at Least One Itinerary From a Departure Location to an Arrival Location" 2019.

U.S. Appl. No. 16/853,914, filed Apr. 21, 2020, entitled, "Method for Computing an Itinerary From a Departure Location to an Arrival Location" 2020.

IÔle De France Mobilités. Open data. https://www.iledefrance-mobilites.fr 2019.

U.S. Appl. No. 16/995,969, filed Aug. 18, 2020, entitled, "Method for Computing an Itinerary From a Departure Location to an Arrival Location" 2020.

European Search Report for EP 19305687.6 (Jul. 25, 2019) Jul. 25, 2019.

European Search Report for EP 19305689.2 (Jul. 26, 2019) Jul. 26, 2019.

English Translation of Abstract of Published Japanese Patent Application No. JP 2014-032139 (A) 2014.

English Translation of Abstract of Published Japanese Patent Application No. JP 2017-075967 (A) 2017.

English Translation of Abstract of Published Japanese Patent Application No. JP 2018-109621 (A) 2018.

English Translation of Abstract of Published Japanese Patent Application No. JP 2007-520685 (A) Jul. 26, 2007 2007.

English Translation of Abstract of Published Japanese Patent Application No. JP 2016-045020 (A) Apr. 4, 2016 2016.

English Translation of Abstract of Published Japanese Patent Application No. JP 2013-511095 (A) Feb. 28, 2013 2013.

Moritz Baum, Valentin Buchhold, Jonas Sauer, Dorothea Wagner, and Tobias Zundorf. Unlimited transfers for multi-modal route planning: An efficient solution. In Proceedings of.

Vassilissa Lehoux and Darko Drakulic. Mode Personalization in Trip-Based Transit Routing. In Gianlorenzo D'Angelo and Twan Dollevoet, editors, 19th Workshop on Algorithmic App.

IÔle De France Mobilités. Open data. https://www.iledefrance-mobilites.fr.

Duc-Minh Phan and Laurent Viennot. Fast public transitrouting with unrestrictedwalking through hub labeling. In Proceedings of the Special Event on Analysis of Experimental A.

Dorothea Wagner and Tobias Zundorf. Public Transit Routing with Unrestricted Walking. In Gianlorenzo D'Angelo and Twan Dollevoet, editors, 17th Workshop on Algorithmic Approac.

E. Cohen, E. Halperin, H. Kaplan, and U. Zwick. Reachability and distance queries via 2-hop labels. SIAM Journal on Computing, 32(5):13381355, 2003.

Julian Dibbelt, Thomas Pajor, and Renato F. Werneck. Public transit labeling. In Bampis E., editor, Experimental Algorithms SEA 2015, vol. 9125 of Lecture Notes in Computer.

Matthias Hertel Hannah Bast and Sabine Storandt. Scalable transfer patterns. In Proceedings of the Eighteenth Workshop on Algorithm Engineering and Experiments (ALENEX), 2016.

Hannah Bast, Mirko Brodesser, and Sabine Storandt. Result Diversity for Multi-Modal Route Plan-ning. In Daniele Frigioni and Sebastian Stiller, editors, 13th Workshop on Algor.

Artigues, Christian, Marie-josé Huguet, Fallou Gueye, Frédéric Schettini, and Laurent Dezou. State-Based Accelerations and Bidirectional Search for Bi-Objective Multi-Modal Sh.

Barrett, Chris, Riko Jacob, and Madhav Marathe. 'Formal-Language-Constrained Path Problems'. SIAM Journal on Computing 30 (2000): 200-0.

Bast, Hannah, Mirko Brodesser, and Sabine Stor. 'Result Diversity for Multi-Modal Route Planning'. In 13th Workshop on Algorithmic Approaches for Transportation Modelling, Opt.

Bast, Hannah, Erik Carlsson, Arno Eigenwillig, Robert Geisberger, Chris Harrelson, Veselin Raychev, and Fabien Viger. 'Fast Routing in Very Large Public Transportation Network.

Bast, Hannah, Daniel Delling, Andrew V. Goldberg, Matthias Müller-hannemann, Thomas Pajor, Peter Sanders, Dorothea Wagner, and Renato F. Werneck. 'Route Planning in Transporta.

Delling, Daniel, Julian Dibbelt, Thomas Pajor, Dorothea Wagner, and Renato F. Werneck. Computing Multimodal Journeys in Practice?, n.d.

Daniel Delling, Thomas Pajor, and Renato F. Werneck. Round-based public transit routing. In Proceedings of the Fourteenth Workshop on Algorithm Engineering and Experiments (AL.

Dibbelt, Julian, Thomas Pajor, Ben Strasser, and Dorothea Wagner. 'Intriguingly Simple and Fast Transit Routing'. In In SEA, vol. 7933 of LNCS, 43-54. Springer, 2013.

Julian Dibbelt, Thomas Pajor, and Dorothea Wagner. User-constrained multi-modal route planning. In SIAM, editor, Proceedings of the 14th Meeting on Algorithm Engineering and.

Garey M. R. and D. S. Johnson. Computers and intractability: A guide to the theory of NP-completeness. Freeman, 1979.

Geisberger, Robert, Peter Sanders, Dominik Schultes, and Daniel Delling. 'Contraction Hierarchies: Faster and Simpler Hierarchical Routing in Road Networks'. In Experimental A.

Goldberg, Andrew V., and Chris Harrelson. 'Computing the Shortest Path: A Search Meets Graph Theory'. In Proceedings of the Sixteenth Annual ACM-SIAM Symposium on Discrete Alg.

Hansen, Pierre. 'Bicriterion Path Problems'. In Multiple Criteria Decision Making Theory and Application, edited by Günter Fandel and Tomas Gal, 177:109-27. Berlin, Heidelberg.

Idri, Abdelfattah, Mariyem Oukarfi, Azedine Boulmakoul, Karine Zeitouni, and Ali Masri. 'A Distributed Approach for Shortest Path Algorithm in Dynamic Multimodal Transportatio.

Kirchler, Dominik. 'Efficient Routing on Multi-Modal Transportation Networks'. Phdthesis, Ecole Polytechnique X, 2013. https://pastel.archives-ouvertes.fr/pastel-00877450.

Liu, Lu, and Liqiu Meng. 'Algorithms of Multi-Modal Route Planning Based on the Concept of Switch Point'. Photogrammetrie—Fernerkundung—Geoinformation 2009, No. 5 (Nov. 1).

Liu, Xudong, Christian Fritz, and Matthew Klenk. 'On Extensibility and Personalizability of Multi-Modal Trip Planning', n.d., 7.

Ulloa Luis, Lehoux Vassilissa, Roulland Fréderic. Trip planning within a multimodal urban mobility, IET Intelligent Transport Systems, 12(2):87-92, 2018.

(56) References Cited

OTHER PUBLICATIONS

Witt, Sascha. 'Trip-Based Public Transit Routing'. ArXiv:1504.07149 [Cs] 9294 (2015): 1025-36. https://doi.org/10.1007/978-3-662-48350-3_85.
Witt, Sacha. Trip-based public transit routing using condensed search trees. In Marc Goerigk and Renato Werneck, editors, 16th Workshop on Algorithmic Approaches for Transpora.
Bast, Hannah, Daniel Delling, Andrew Goldberg, Matthias Müller-Hannemann, Thomas Pajor, Peter Sanders, Dorothea Wagner, and Renato F. Werneck. 'Route Planning in Transportatio.
Web page: https://data.grandlyon.com/ Home • Métropolitan Data of the Grand Lyon.Pdf', n.d.
Web page : https://opendata.stif.info. 'Home page—Portail Open Data Île-de-france Mobilites—Open Data Île-de-France Mobilités. Pdf', n.d.
"General transit feed standard format reference documentation," https://developers.google.com/transit/gtfs/reference/.
U.S. Appl. No. 16/830,609, filed Mar. 26, 2020, entitled, Methods for Preprocessing a Set of Feasible Transfers for Computing Itineraries in a Multimodal Tr.
U.S. Appl. No. 16/830,621, filed Mar. 26, 2020, entitled, Method for Preprocessing a Set of Non-Scheduled Lines Within a Multimodal Transportation Network O.
U.S. Appl. No. 16/700,096, filed Dec. 2, 2019, entitled, "Method for Computing at Least One Itinerary From a Departure Location to an Arrival Location".
U.S. Appl. No. 16/853,914, filed Apr. 21, 2020, entitled, "Method for Computing an Itinerary From a Departure Location to an Arrival Location".

\* cited by examiner

| Arrival time based pruning |
|---|

Input: Timetable data, footpath data, transfer set $\mathcal{T}$
Output: Reduced transfer set $\mathcal{T}$
for each trip $t$ do
    $\tau_A(.) \leftarrow \infty$     ▷ Earliest arrival time at stops
    $\tau_C(.) \leftarrow \infty$     ▷ Earliest change time at stops
    for $i \leftarrow |\vec{p}(t)| - 1, \ldots, 1$ do
        $\tau_A(t@i) \leftarrow \min(\tau_A(t@i), \tau_{arr}(t,i))$
        $\tau_C(t@i) \leftarrow \min(\tau_C(t@i), \tau_{arr}(t,i) + \Delta\tau_{fp}(t@i, t@i))$
        for each stop $q \neq t@i$ such that $\Delta\tau_{fp}(t@i, q)$ is defined do
            $\tau_A(q) \leftarrow \min(\tau_A(q), \tau_{arr}(t,i) + \Delta\tau_{fp}(t@i, q))$
            $\tau_C(q) \leftarrow \min(\tau_C(q), \tau_{arr}(t,i) + \Delta\tau_{fp}(t@i, q))$
        end for
        for each transfer $t@i \rightarrow u@j \in \mathcal{T}$ do
            $keep \leftarrow$ false
            for each stop $u@k$ on trip $u$ with $k > j$ do
                $keep \leftarrow keep \vee \tau_{arr}(u,k) < \tau_A(u@k)$
                $keep \leftarrow keep \vee \tau_{arr}(u,k) + \Delta\tau_{fp}(u@k, u@k) < \tau_C(u@k)$
                $\tau_A(u@k) \leftarrow \min(\tau_A(u@k), \tau_{arr}(u,k))$
                $\tau_C(u@k) \leftarrow \min(\tau_C(u@k), \tau_{arr}(u,k) + \Delta\tau_{fp}(u@k, u@k))$
                for each stop $q \neq u@k$ such that $\Delta\tau_{fp}(u@k, q)$ is defined do
                    $\rho \leftarrow \tau_{arr}(u,k) + \Delta\tau_{fp}(u@k, q)$
                    $keep \leftarrow keep \vee (\rho < \tau_A(q)) \vee (\rho < \tau_C(q))$
                    $\tau_A(q) \leftarrow \min(\tau_A(q), \rho)$
                    $\tau_C(q) \leftarrow \min(\tau_C(q), \rho)$
                end for
            end for
            if $\neg keep$ then
                $\mathcal{T} \leftarrow \mathcal{T} \setminus \{t@i \rightarrow u@j\}$     ▷ No improvement: remove the transfer
            end if
        end for
    end for
end for

Figure 7

| Transfer set building |
|---|

Input: Timetable data, footpath data
Output: Reduced transfer set $\mathscr{T}$
$\mathscr{T} \leftarrow \emptyset$
for each line $L$ do
    $\mathscr{T}(L) \leftarrow LINE\_TRANSFERS(L)$
    for each trip $t$ of $L$ do
        $T \leftarrow \emptyset$      ▷ Transfer set for each target line
        $L_{prev} \leftarrow$ null
        for each transfer $(i, L'@j, \Delta)$ of $\mathscr{T}(L)$ do
            if $L_{prev} \neq L'$ then
                $\mathscr{T} \leftarrow \mathscr{T} \cup T$
                $T \leftarrow \emptyset, L_{prev} = L'$
            end if
            $t' \leftarrow$ earliest trip of $L'$ at $j$ such that $\tau_{dep}(t', j) \geq \tau_{arr}(t, i) + \Delta$
            if $T = \emptyset$ then
                $T(L') \leftarrow \{t@i \to t'@j\}$
            else
                if $t@i \to t'@j$ is not dominated by an element of $T$ then
                    Update $T$ with $t@i \to t'@j$
                end if
            end if
        end for
        $\mathscr{T} \leftarrow \mathscr{T} \cup T$
    end for
end for
return $\mathscr{T}$ procedure LINE_TRANSFERS(line $L$, footpath data)      ▷ Builds the line neighborhood
    for $i \leftarrow |\vec{p}(L)| - 1, \ldots, 1$ do
        for each stop $q$ such that $\Delta\tau_{fp}(L@i, q)$ is defined do
            for each $(L', j)$ such that $q = L'@j$ do
                $\mathscr{T} \leftarrow \mathscr{T} \cup (i, L'@j, \Delta\tau_{fp}(L@i, L'@j))$
            end for
        end for
    end for
    Sort $\mathscr{T}$ first by target line, then by decreasing origin line index, then by increasing target line index, then by chosen sorting in case of tides
    return $\mathscr{T}$
end procedure

Figure 8

```
                          Earliest arrival query
Input:  Timetable, transfer set T, source stop p_src, target stop p_tgt, departure time τ
Output: Result set J
 1:  J ← ∅
 2:  ℒ ← ∅
 3:  Q_n ← ∅ for n = 0, 1, ...
 4:  R(t) ← ∞ for all trips t
 5:  for each stop q such that Δτ_fp(q, p_tgt) is defined do
 6:      Δτ ← 0 if p_tgt = q, else Δτ_fp(q, p_tgt)
 7:      for each (L, i) ∈ L(q) do
 8:          ℒ ← ℒ ∪ {(L, i, Δτ)}
 9:  for each stop q such that Δτ_fp(p_src, q) is defined do
10:      Δτ ← 0 if p_src = q, else Δτ_fp(p_src, q)
11:      for each (L, i) ∈ L(q) do
12:          t ← earliest trip of L such that τ + Δτ ≤ τ_dep(t, i)
13:          ENQUEUE(t, i, 0)
14:  τ_min ← ∞
15:  n ← 0
16:  while Q_n ≠ ∅ do
17:      for each p_t^b → p_t^e ∈ Q_n do
18:          for each (L_t, i, Δτ) ∈ ℒ with b < i and τ_arr(t, i) + Δτ < τ_min do
19:              τ_min ← τ_arr(t, i) + Δτ
20:              J ← J ∪ {(τ_min, n)}, removing dominated entries
21:          if τ_arr(t, b + 1) < τ_min then
22:              for each transfer p_t^i → p_u^j ∈ T with b < i ≤ e do
23:                  ENQUEUE(u, j, n + 1)
24:      n ← n + 1

1:  procedure ENQUEUE(trip t, index i, number of transfers n)
 2:      if i < R(t) then
 3:          Q_n ← Q_n ∪ {p_t^i → p_t^{R(t)}}
 4:          for each trip u with t ⪯ u ∧ L_t = L_u do
 5:              R(u) ← min(R(u), i)
```

Figure 9

| Earliest arrival query |
|---| input Timetable data, transfer set $T$
input Source stop $p_{src}$, destination stop $p_{tgt}$, start time $\tau$
input Maximum transfer duration $\Delta\tau_{max}$, transfer duration coefficient $\sigma$
output Result set $J$ $J \leftarrow \emptyset, \mathscr{L} \leftarrow \emptyset$
$Q_n \leftarrow \emptyset$ for $n = 0, 1, \ldots$
$R(.) \leftarrow \infty$ for all trips $t$ INITIALIZATION()
$\tau_{min} \leftarrow \infty$         ▷ The current minimum arrival time at target
$n \leftarrow 0$
while $Q_n \neq \emptyset$ do
    for each $t@b \to t@e \in Q_n$ do
        ▷ Checking if a target is reached
        for each $(L_t, i, \Delta\tau) \in \mathscr{L}$ with $b < i$ and $\tau_{arr}(t, i) + \Delta\tau < \tau_{min}$ do
            $\tau_{min} \leftarrow \tau_{arr}(t, i) + \Delta\tau$
            $J \leftarrow J \cup \{(\tau_{min}, n)\}$, removing dominated entries
        end for if $\tau_{arr}(t, b+1) < \tau_{min}$ then     ▷ Filling the queue for the next round
            for each transfer $(t@i \to u@j, \Delta\tau, \sigma_{max}) \in T$ with $b < i \leq e$ and
                $\sigma \times \Delta\tau \leq \Delta\tau_{max}$ and $\sigma \leq \sigma_{max}$ do
                ENQUEUE$(u, j, n+1)$
            end for
        end if
    end for
    $n \leftarrow n + 1$
end while

Figure 10

| Auxiliary procedures |
|---| procedure INITIALIZATION
    for each stop $q$ such that $\Delta\tau_{fp}(q, p_{tgt})$ is defined do
        $\Delta\tau \leftarrow 0$ if $p_{tgt} = q$, else $\Delta\tau = \sigma \times \Delta\tau_{fp}(q, p_{tgt})$
        for each $(L, i) \in \mathbf{L}(q)$ do
            $\mathscr{L} \leftarrow \mathscr{L} \cup \{(L, i, \Delta\tau)\}$
        end for
    end for for each stop $q$ such that $\Delta\tau_{fp}(p_{src}, q)$ is defined do
        $\Delta\tau = 0$ if $p_{src} = q$, else $\Delta\tau = \sigma \times \Delta\tau_{fp}(p_{src}, q)$
        for each $(L, i) \in \mathbf{L}(q)$ do
            $t \leftarrow$ earliest trip of $L$ such that $\tau + \Delta\tau \leq \tau_{dep}(t, i)$
            ENQUEUE$(t, i, 0)$
        end for
    end for
end procedure procedure ENQUEUE(trip $t$, index $i$, nb transfers $n$)
    if $i < R(t)$ then
        $Q_n \leftarrow Q_n \cup \{t@i \rightarrow t@R(t)\}$
        for each trip $u$ with $t \leq u$ and $L_t = L_u$ do
            $R(u) \leftarrow \min(R(u), i)$
        end for
    end if
end procedure

Figure 11

Modifications of arrival time based pruning

Input: Timetable data, footpath data, transfer set $\mathcal{T}$
Input: System maximum duration coefficient $\varsigma_{max}$
Output: Reduced transfer set $\mathcal{T}$ for each trip $t$ do
    $\tau_A(.) \leftarrow \emptyset$     ▷ Label bag with earliest arrival time at stops
    $\tau_C(.) \leftarrow \emptyset$     ▷ Label bag with earliest change time at stops
    for $i \leftarrow |\vec{p}(t)| - 1, \ldots, 1$ do
        Update $\tau_A(t@i)$ with label $(\tau_{arr}(t,i), 0, 0, \varsigma_{max})$
        Update $\tau_C(t@i)$ with label $(\tau_{arr}(t,i), \Delta\tau_{fp}(t@i, t@i), 0, \varsigma_{max})$
        for each stop $q \neq t@i$ such that $\Delta\tau_{fp}(t@i, q)$ is defined do
            Update $\tau_A(q)$ with label $(\tau_{arr}(t,i), \Delta\tau_{fp}(t@i, q), \Delta\tau_{fp}(t@i, q), \varsigma_{max})$
            Update $\tau_C(q)$ with label $(\tau_{arr}(t,i), \Delta\tau_{fp}(t@i, q), \Delta\tau_{fp}(t@i, q), \varsigma_{max})$
        end for
        for each transfer $(t@i \to u@j, \Delta\tau, \sigma_{max}) \in \mathcal{T}$ do
            $keep \leftarrow false$
            for each stop $u@k$ on trip $u$ with $k > j$ do
                if $(\tau_{arr}(u,k), 0, \Delta\tau, \sigma_{max})$ is not dominated in $\tau_A(u@k)$ then
                    Update $\tau_A(u@k)$ with $(\tau_{arr}(u,k), 0, \Delta\tau, \sigma_{max})$
                    $keep \leftarrow true$
                end if
                $lab_C \leftarrow (\tau_{arr}(u,k), \Delta\tau_{fp}(u@k, u@k), \max(\Delta\tau, \Delta\tau_{fp}(u@k, u@k)), \sigma_{max})$
                if $lab_C$ is not dominated in $\tau_C(u@k)$ then
                    Update $\tau_C(u@k)$ with $lab_C$
                    $keep \leftarrow true$
                end if
                for each stop $q \neq u@k$ such that $\Delta\tau_{fp}(u@k, q)$ is defined do
                    $lab \leftarrow (\tau_{arr}(u,k), \Delta\tau_{fp}(u@k, q), \max(\Delta\tau, \Delta\tau_{fp}(u@k, q)), \sigma_{max})$
                    if $lab$ is not dominated in $\tau_A(q)$ then
                        Update $\tau_A(q)$ with $lab$
                        $keep \leftarrow true$
                    end if
                    if $lab$ is not dominated in $\tau_C(q)$ then
                        Update $\tau_C(q)$ with $lab$
                        $keep \leftarrow true$
                    end if
                end for
            end for
            if $\neg keep$ then
                $\mathcal{T} \leftarrow \mathcal{T} \setminus \{(t@i \to u@j, \Delta\tau, \sigma_{max})\}$     ▷ No improvement: remove the transfer
            end if
        end for
    end for
end for

Figure 14

```
Modification of transfer set building
```
Input: Timetable data, footpath data
Input: Maximum and minimum transfer duration coefficients $\varsigma_{max}$ and $\varsigma_{min}$
Output: Reduced transfer set $\mathcal{T}$ $\mathcal{T} \leftarrow \emptyset$
for each line $L$ do
    $\mathcal{T}(L) \leftarrow LINE\_TRANSFERS(L)$
    for each trip $t$ of $L$ do
        $T \leftarrow \emptyset$       ▷ Transfer set for each target line
        $L_{prev} \leftarrow$ null
        for each transfer $(i, L'@j, \Delta\tau)$ of $\mathcal{T}(L)$ do
            if $L_{prev} \neq L'$ then
                $\mathcal{T} \leftarrow \mathcal{T} \cup T$
                $T \leftarrow \emptyset, L_{prev} = L'$
            end if
            $t'_{min} \leftarrow$ earliest trip of $L'$ at $j$ such that $\tau_{dep}(t'_{min}, j) \geq \tau_{arr}(t, i) + \Delta\tau \times \varsigma_{min}$
            $t'_{max} \leftarrow$ earliest trip of $L'$ at $j$ such that $\tau_{dep}(t'_{max}, j) \geq \tau_{arr}(t, i) + \Delta\tau \times \varsigma_{max}$
            $Labs \leftarrow \emptyset$
            for each trip $t', t'_{min} \leq t' \leq t'_{max}$ do
                $\sigma_{max} \leftarrow$ maximum value $\sigma \leq \varsigma_{max}$ such that $\tau_{dep}(t', j) \geq \tau_{arr}(t, i) + \Delta\tau \times \sigma$
                $Labs \leftarrow Labs \cup \{(t@i \rightarrow t'@j, \Delta\tau, \sigma_{max})\}$
            end for
            if $T = \emptyset$ then
                $T(L') \leftarrow Labs$
            else
                for each $lab \in Labs$ do
                    if $lab$ is not dominated by an element of $T$ then
                        Update $T$ with $lab$
                    end if
                end for
            end if
        end for
        $\mathcal{T} \leftarrow \mathcal{T} \cup T$
    end for
end for
return $\mathcal{T}$ procedure LINE_TRANSFERS(line $L$, footpath data)    ▷ Builds the line neighborhood
    for $i \leftarrow |\vec{p}(L)| - 1, \ldots, 1$ do
        for each stop $q$ such that $\Delta\tau_{fp}(L@i, q)$ is defined do
            for each $(L', j)$ such that $q = L'@j$ do
                $\mathcal{T} \leftarrow \mathcal{T} \cup (i, L'@j, \Delta\tau_{fp}(L@i, L'@j))$
            end for
        end for
    end for
    Sort $\mathcal{T}$ first by target line, then by decreasing origin line index, then by increasing target line index, then by chosen sorting in case of ties
    return $\mathcal{T}$
end procedure

Figure 15

Table 1

| Data set | Nb stops | Nb trips | Nb lines | Nb connections | Nb foot paths |
|---|---|---|---|---|---|
| IDFM 10 min | 42.3K | 319.2K | 1.9K | 103.769M | 846.2K |
| Korea | 180.9K | 446.7K | 31.7K | 241.885M | 4.196M |

Table 2

| Version | nb trips | nb kept transfers | nb removed transfers | Mean computation time (s) | size of transfer file (MB) |
|---|---|---|---|---|---|
| Standard | 319 K | 98.1 M | 1 314.8 M | 44 | 1867 |
| Variable speed | 319 K | 153.0 M | 1 443.9 M | 94 | 3223 |
| Max. duration and var. speed | 319 K | 242.9 M | 1 353.9 M | 1892 | 5119 |

Table 3

| Version | Fast | Standard | Slow |
|---|---|---|---|
| Variable speed | 126.6 M | 114.5 M | 99.5 M |
| Max. duration and var. speed | 209.4 | 196.9 M | 179.0 M |

Table 4

| Version | nb trips | nb kept transfers | nb removed transfers | Mean computation time (s) | size of transfer file (MB) |
|---|---|---|---|---|---|
| Standard | 447 K | 238.1 M | 3 251.9 M | 170 | 4482 |
| Variable speed | 447 K | 463.8 M | 4 106.3 M | 490 | 9 707 |
| Maximum duration and variable speed | 447 K | 658.1 M | 3 912.1 M | 14 773 | 13 758 |

Table 5

| Version | Fast | Standard | Slow |
|---|---|---|---|
| Variable speed | 379.8 M | 324.8 M | 248.1 M |
| Max duration and variable speed | 548.4 M | 486.7 M | 392.0 M |

Figure 16

Table 6

| Data set | Version | Speed | Mean query time (s) | Mean nb solutions |
|---|---|---|---|---|
| IDFM 10 min | Standard | - | 0.098 | 1.4 |
| IDFM 10 min | Variable speed | Standard | 0.103 | 1.4 |
| IDFM 10 min | Variable speed | Slow | 0.083 | 1.38 |
| IDFM 10 min | Variable speed | Fast | 0.087 | 1.42 |
| IDFM 10 min | Max. duration - var. speed | Standard | 0.1 | 1.4 |
| IDFM 10 min | Max. duration - var. speed | Slow | 0.1 | 1.38 |
| IDFM 10 min | Max. duration - var. speed | Fast | 0.1 | 1.42 |
| Korea | Standard | - | 0.405 | 1.78 |
| Korea | Variable speed | Standard | 0.41 | 1.78 |
| Korea | Variable speed | Slow | 0.37 | 1.74 |
| Korea | Variable speed | Fast | 0.4 | 1.82 |
| Korea | Max. duration - var. speed | Standard | 0.827 | 1.78 |
| Korea | Max. duration - var. speed | Slow | 0.75 | 1.74 |
| Korea | Max. duration - var. speed | Fast | 0.6 | 1.82 |

Table 7

| Data set | Speed | Max transfer time (min) | Mean query time (s) | Mean nb solutions |
|---|---|---|---|---|
| IDFM 10 min | Standard | - | 0.1 | 1.4 |
| IDFM 10 min | Standard | 5 | 0.1 | 1.45 |
| IDFM 10 min | Slow | - | 0.1 | 1.38 |
| IDFM 10 min | Slow | 5 | 0.09 | 1.48 |
| IDFM 10 min | Fast | - | 0.1 | 1.42 |
| IDFM 10 min | Fast | 5 | 0.095 | 1.45 |
| Korea | Standard | - | 0.827 | 1.78 |
| Korea | Standard | 5 | 0.78 | 1.8 |
| Korea | Slow | - | 0.75 | 1.74 |
| Korea | Slow | 5 | 0.63 | 1.73 |
| Korea | Fast | - | 0.6 | 1.82 |
| Korea | Fast | 5 | 0.48 | 1.79 |

Figure 17

Table 8

| Data set | Version | Speed | Mean query time (s) | Mean nb solutions |
|---|---|---|---|---|
| IDFM 10 min | Standard | - | 0.139 | 2.1 |
| IDFM 10 min | Variable speed | Standard | 0.146 | 2.1 |
| IDFM 10 min | Variable speed | Slow | 0.118 | 2.04 |
| IDFM 10 min | Variable speed | Fast | 0.126 | 2.28 |
| IDFM 10 min | Max. duration - var. speed | Standard | 0.144 | 2.1 |
| IDFM 10 min | Max. duration - var. speed | Slow | 0.137 | 2.04 |
| IDFM 10 min | Max. duration - var. speed | Fast | 0.126 | 2.28 |
| Korea | Standard | - | 0.727 | 2.9 |
| Korea | Variable speed | Standard | 0.721 | 2.9 |
| Korea | Variable speed | Slow | 0.666 | 2.84 |
| Korea | Variable speed | Fast | 0.68 | 3.1 |
| Korea | Max. duration - var. speed | Standard | 1.6 | 2.9 |
| Korea | Max. duration - var. speed | Slow | 1.426 | 2.84 |
| Korea | Max. duration - var. speed | Fast | 1.034 | 3.1 |

Table 9

| Data set | Speed | Max transfer time (min) | Mean query time (s) | Mean nb solutions |
|---|---|---|---|---|
| IDFM 10 min | Standard | - | 0.14 | 2.1 |
| IDFM 10 min | Standard | 5 | 0.136 | 2.14 |
| IDFM 10 min | Slow | - | 0.137 | 2.04 |
| IDFM 10 min | Slow | 5 | 0.123 | 2.1 |
| IDFM 10 min | Fast | - | 0.126 | 2.28 |
| IDFM 10 min | Fast | 5 | 0.124 | 2.23 |
| Korea | Standard | - | 1.6 | 2.9 |
| Korea | Standard | 5 | 1.43 | 3.03 |
| Korea | Slow | - | 1.43 | 2.84 |
| Korea | Slow | 5 | 1.122 | 2.91 |
| Korea | Fast | - | 1.034 | 3.1 |
| Korea | Fast | 5 | 0.909 | 3.16 |

Figure 18

METHOD FOR COMPUTING A PERSONALIZED ITINERARY FROM A DEPARTURE LOCATION TO AN ARRIVAL LOCATION

PRIORITY INFORMATION

The present application claims priority, under 35 USC § 119(e), from U.S. Provisional Patent Application, Ser. No. 63/068,581, filed on Aug. 21, 2020. The entire content of U.S. Provisional Patent Application, Ser. No. 63/068,581, filed on Aug. 21, 2020, is hereby incorporated by reference.

BACKGROUND

A journey planner (also called trip planner) is a solver used to determine an itinerary from an origin location (the origin) to an arrival location (the destination), using one or more transport modes, in particular public transportation modes (subway, tram, bus, etc.—the planner is said to be "multimodal" when covering several transportation modes and allowing intermodal transfers from one mode to another). Searches may be optimized on different criteria, for example fastest, shortest, least changes, cheapest. Searches may be constrained for example to leave or arrive at a certain time, to avoid certain waypoints, etc.

Public transport modes generally operate according to published schedules; given that public transport services only depart at specific times (unlike private modes of transportation such as driving, walking, or cycling, which may leave at any time), an algorithm must therefore not only find a path to a destination, but seek to optimize it so as to minimize the arrival time in this time-dependent setting.

In mobility applications or websites, finding possible paths between an origin and a destination is a classical problem. One algorithm used to this end is the "Trip-Based Public Transit Routing" algorithm, which is a method based on iterations, similar to breadth-first search in a graph, where one iteration corresponds to taking a trip.

It is disclosed in an article by Sascha Witt, entitled "Trip-Based Public Transit Routing," published in pages 1025-1036 of "Algorithms-ESA 2015", 23rd Annual European Symposium, Patras, Greece, Sep. 14-16, 2015, edited by Nikhil Bansal and Irene Finocchi; volume 9294 of the *Lecture Notes in Computer Science*, Berlin, Heidelberg, 2015; Springer (referred to hereinafter as "Witt's Trip-Based Public Transit Routing Article").

The Trip-Based Public Transit Routing algorithm is an algorithm for computing a Pareto front and a Pareto path per value in the Pareto front for two criteria in multimodal networks restricted to transit and walking between stations, considering an origin, a destination, and a start time. In the Trip-Based Public Transit Routing algorithm, the criteria, minimum arrival time (i.e., the earliest arrival time considering the start time) and minimum transfer number (i.e., the minimum number of changes of transport mode, either within the same network or intermodally), are optimized.

If a set of criteria $(c_1, c_2, \ldots, c_n)$ is to be minimized, a n-tuple $(v_1, v_2, \ldots, v_n)$ of values for those criteria is non-dominated in the Pareto sense if there is no other n-tuple $(v'_1, v'_2, \ldots, v'_n)$ such that for all $i \in \{1, 2, \ldots, n\}$, $v'_i \leq v_i$ and $\exists i \in \{1, 2, \ldots, n\}$ such that $v'_i < v_i$. The set of all optimal values is called Pareto front. An optimal path, in the Pareto sense, for minimum arrival time and minimum number of transfers is hence a path whose values belong to the Pareto front. The Trip-Based Public Transit Routing algorithm builds the Pareto front for minimum arrival time and minimum number of transfers and returns one optimal itinerary with this value for each element in the Pareto front in polynomial time.

The Trip-Based Public Transit Routing algorithm is based on the preprocessing and pruning of the feasible transfers between trips. The aim is to build for each trip a neighborhood of reachable trips in such way that when searching this graph structure, the Pareto front can be obtained.

An earliest arrival time query will then consist in a simple breadth-first search exploration in a time-independent network where the trips are vertices and the possible transfers the arcs.

An example of this graphical representation of the transportation network is illustrated in FIG. 2.

The Trip-Based Public Transit Routing algorithm can also cover profile queries, where all the optimal paths must be found for a given starting time range.

FIG. 2 illustrates the modeling of the network in the Trip-Based Public Transit Routing algorithm search phase. Public transit information is represented using a graph, whose vertices (or nodes) are the trips of the public transit network and those arcs represent the possibility to transfer between two trips at given stops. FIG. 2 illustrates the modeling of a transfer 15 between a first trip 10 of a public transit network at station (stop) (i) and a second trip 20 of the public transit network at station (stop) (j). FIG. 2 further illustrates a second transfer 25 between the first trip 10 of the public transit network at station (stop) (u) and a third trip 30 of the public transit network at station (stop) (v). As illustrated in FIG. 2, node 11 corresponds to trip 10, node 21 corresponds to trip 20, and node 31 corresponds to trip 30.

As illustrated in FIG. 2, transfer 15 corresponds to arc 17 and transfer 25 corresponds to arc 27. It is noted that several feasible transfers are often possible between two trips.

FIG. 3 illustrates an example of a trip-based public transit routing process that utilizes a database 50 containing public transit routing information for a particular area, such as a city. A preprocessing process 51 constructs a set of feasible transfers between trips in the public transit network using the Trip-Based Public Transit Routing algorithm. A trip, in the Trip-Based Public Transit Routing algorithm, is an ordered list of arrival and departure times at stops/stations that will be fulfilled by a single vehicle. The trip, in the Trip-Based Public Transit Routing algorithm, corresponds to taking one vehicle of a line. A line is an ordered set of trips sharing the same sequence of stops visited by the vehicles corresponding to the trips and where trips do not overtake one another (the order of the arrival and departure times of the trip is the same for all the stops of the line).

As illustrated in FIG. 3, a pruning process 53 prunes the set of feasible transfers between trips in the public transit network. The preprocessing and pruning of the feasible transfers between trips build, for each trip, a neighborhood of reachable trips that will be smaller than the complete neighborhood. For the algorithm to be correct, for each element in the Pareto front, there should be at least one solution in the Pareto set with this value such that all the transfers of this solution belong to the set. The pruning process 53 ensures the correction.

A search engine module 57 finds the Pareto front and one solution per element in the Pareto front 59 by performing an earliest arrival time query that consists in a simple breadth-first search like exploration in a time-independent network where the trips are the nodes of FIG. 2 and the possible transfers are the arcs of FIG. 2. So, for each iteration, one additional trip is taken in each solution to try and get to destination.

Lastly, as illustrated in FIG. 3, a user is enabled to define parameters 55. The parameters include origin, destination, and start time or time range.

In the system, described above, with respect to FIGS. 2 and 3, the user is not able to specify a maximum transfer duration and/or a transfer speed.

Personalization of transfer times is a desirable feature for routing applications, as in many contexts, users have an a priori idea of the maximum duration they wish to spend on a transfer, or the speed at which they will perform it. Sometimes, the maximum duration or speed is related to weather (not walking too much in the rain or walking more slowly when it is hot and/or humid), to a trip's purpose (traveling with heavy luggage, taking small kids to an activity) or simply to the user's physical condition (elderly or disabled).

In some other cases, a user might wish to set a large maximum duration and a high speed. For example, a user may see a long transfer at a brisk pace as an opportunity to keep fit.

Moreover, some modes, that include the use of a kick scooter or roller blades that can be carried by the user in the public transit network, can be modeled by a faster transfer.

Therefore, it is desirable to provide a process that allows a user to personalize the routing generating routine to take into account desired parameters, unique to the user.

Moreover, it is desirable to provide a process that allows a user to the select, at query time, the maximum transfer duration (within a given range or interval which may be bounded or unbounded) and/or an appropriate transfer speed (within a range or among speed categories).

Furthermore, it is desirable to provide a process that allows a user to select, at query time, the maximum transfer duration and/or an appropriate transfer speed without significantly impacting the processing time to generate the possible itineraries.

BRIEF DESCRIPTION OF THE DRAWINGS

The drawings are only for purposes of illustrating various embodiments and are not to be construed as limiting, wherein:

FIG. 7 illustrates an algorithmic example of preprocessing a set of feasible transfers using arrival time-based pruning;

FIG. 8 illustrates another algorithmic example of building and preprocessing a set of feasible transfers using line-based pruning;

FIG. 9 illustrates a conventional algorithmic example of an earliest arrival time query in a public transit network with a data model where trips are represented as nodes and feasible transfers are represented as arcs;

FIG. 10 and FIG. 11 illustrate an algorithmic example of an earliest arrival time query in a public transit network with a data model where trips are represented as nodes and feasible transfers are represented as arcs;

FIG. 14 illustrates an algorithmic example of preprocessing a set of feasible transfers using arrival time based pruning;

FIG. 15 illustrates an algorithmic example of building and preprocessing a set of feasible transfers using line-based pruning;

FIG. 16 illustrates Tables 1-5;

FIG. 17 illustrates Table 6 and Table 7; and

FIG. 18 illustrates Table 8 and Table 9.

DETAILED DESCRIPTION

Figure 1:
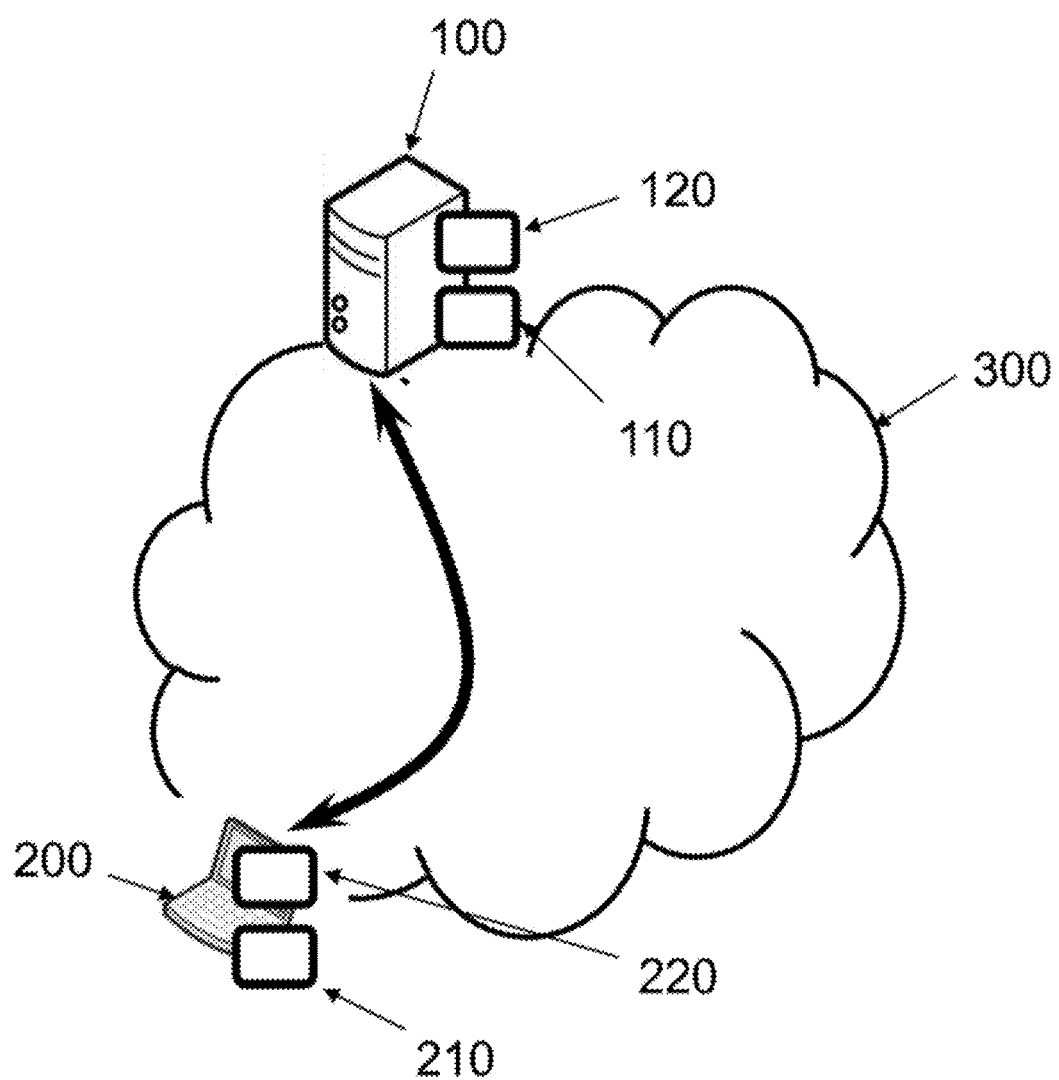
FIG. 1 illustrates an example of architecture of a system for computing an itinerary from a departure location to an arrival location.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

A method for computing at least one itinerary, when at least one itinerary is feasible (e.g., when arrival times plus transfer duration is less than or equal to the departure time at possible line transfers), from a departure location to an arrival location, which allows a user to select, at query time, a maximum transfer duration (which is also referred to herein a system maximum transfer time) and/or an appropriate transfer speed (which is also referred to herein as a transfer duration coefficient), will be described below.

In the description below, the departure and arrival locations are geographical locations, typically locations on a map as defined by an address, a point of interest, coordinates, etc.

In the description below, the determined itineraries are preferably the optimal ones (or at least close to the optimal ones; i.e., approximations of the optimal ones) according to at least one criterion such as the arrival time (which should be the earliest), the duration of the itinerary (which should be the lowest), the departure time (which should be the latest), the length of the itinerary (which should be the shortest), the number of transfers (which should be the lowest), the price (which should be the lowest), etc.

Generally speaking, a "cost" of the itinerary can be computed according to a given cost function, the cost being minimized and possibly multidimensional.

In a preferred example of the Trip-Based Public Transit Routing algorithm that will be detailed in the following description, two criteria are co-considered: (1) arrival time and (2) the number of transfers.

Furthermore, each itinerary comprises a multimodal transportation network of predetermined stations. The multimodal transportation network is preferably a network of public transportation modes, in particular "scheduled" transportation modes; i.e., following a line (a predetermined sequence of stations) and of which timetables are known.

Examples of scheduled public transportation modes include bus, metro, tramway, train, water shuttle, carpooling, etc. It is to be noted that the multimodal transportation network might further comprise non-scheduled transportation modes such as on-demand bus, ride-hailing, or even bike sharing (wherein the users can simply take a bike for going from a station to another without any restriction), but advantageously only walking and scheduled public transportation modes are hereby involved in the multimodal transportation network.

By station, or "stop," it is meant a facility at a given location wherein at least one of the transportation modes of the multimodal transportation network regularly stops to load or unload passengers, for example a bus station, a metro station, a train station, etc.

A travel between two consecutive stations during a trip is called "connection." It is associated with a departure time from the first stop and an arrival time at the second stop.

A trip is a set of ordered arrival/departure times at stations/stops for a single vehicle.

A transfer corresponds to leaving one trip at its $i^{th}$ stop and taking (starting) a second trip at its $j^{th}$ stop.

In the following description, the multimodal network is restricted to a public transit network and walking between stations, wherein a transfer is walking between stations. The transfers could of course be done using a non-walking mode (such as a kick scooter or roller blades), if speed personalization is added.

The method, described below, may be implemented within an architecture such as illustrated in FIG. 1, by means of a server 100 and/or a client 200. The client 200 may include a computer (as shown in FIG. 1), a tablet, a mobile device (such as a smartphone), or smart speaker.

Each of these devices 100, 200 are typically connected to an extended network 300 such as the Internet for data exchange. Each one comprises data processors 110, 210, and optionally memory 120, 220 such as a hard disk.

More precisely, the user generally uses a client device 200 of the smartphone or smart speaker type, for inputting a request for itineraries (are inputted the departure location, the arrival location, and a departure time or range thereof or an arrival time or range thereof). The request may be either directly processed by the client 200, or transmitted to the server 100 for being processed there. The described methodology is not limited to any specific implementation.

It is to be noted that even if the method is performed by the client device 200, the server 100 can still be called for performing any of the subroutines.

In the description below, the following notations will be utilized.

t@i represents the pair (t, i) where t is a trip and i is an index in its stop sequence; i.e., t@i represents the $i^{th}$ stop of trip t. If several identical stops in the sequence (i.e. the trip return at a previously visited stop), t@i refers to the one in the $i^{th}$ position, that is the index of the stop is also referenced in the notation.

$\vec{p}(t)=(t@1, t@2, \ldots)$ is the stop sequence of trip t.

$\tau_{arr}(t,i)$ is the arrival time and $\tau_{dep}(t,i)$ is the corresponding departure time at t@i of trip t.

More specifically, a sequence of stops $\vec{p}(t)=(t@0, t@1, \ldots)$ is associated with each trip t. The schedule of t is defined by the arrival and departure times of t at the stops of its sequence. $\tau_{arr}(t,i)$ is the arrival time of t at the $i^{th}$ stop of $\vec{p}(t)$, and $\tau_{dep}(t,i)$ is the departure time of t at the $i^{th}$ stop of $\vec{p}(t)$. Trips are grouped into lines that do not exactly represent the routes of the public transport network. First, all the trips of a line L have exactly the same sequence of stops, denoted $\vec{p}(L)=(L@0, L@1, \ldots)$. Second all the trips of a line are completely ordered following comparison relations $\preceq$ and $\prec$ defined for two trips having the same sequence:

$$t \preceq u \Leftrightarrow \forall i \in [0, |\vec{p}(t)|], \tau_{arr}(t,i) \leq \tau_{arr}(u,i)$$

and $$t \prec u \Leftrightarrow t \preceq u \text{ and } \exists i \in [0, |\vec{p}(t)|], \tau_{arr}(t,i) < \tau_{arr}(u,i)$$

For a given stop s, L(s) is defined as the set of all pairs (L, i), wherein L is a line and i is an index in the sequence of L such that s=L@i. A displacement between the $i^{th}$ stop of t and the $j^{th}$ stop of t using trip t is denoted t@i→t@j, and similarly, a transfer between trip t at the $i^{th}$ station and trip u at the $j^{th}$ station is denoted t@i→u@j. Walking transfer times are defined for any pair of stops (p,q), p≠q that are close enough of one another and the associated duration is $\Delta\tau_{fp}(p,q)$. When transferring between two trips at a given station (t@i=u@j=p), a minimum change time $\Delta\tau_{fp}(p,p)$ can be defined, to represent the time needed to move within this station. A line L is an ordered set of trips $t_0, t_1, t_2, \ldots$, such that all trips of the line have the same stop sequence (denoted $\vec{p}(L)$) and do not overtake one another.

A transfer t@i→u@j is feasible if and only if $\Delta\tau_{fp}(t@i, u@j)$ is defined and $$\tau_{arr}(t,i) + \Delta\tau_{fp}(t@i, u@j) \leq \tau_{dep}(u,j)$$

T is the set of all feasible transfers.

The set of feasible transfers for a trip t contains all transfers from the $i^{th}$ stop, t@i, of trip t to the $j^{th}$ stop, u@j, of trip u such that a user can reach stop u@j on time to get trip u after alighting t at stop t@i.

Using the data representation disclosed in Witt's Trip-Based Public Transit Routing Article, it is possible to represent the public transit routing information by a graph where each node corresponds to a trip and arcs each correspond to a feasible transfer. Graph exploration methods can then be applied on that graph in order to build itineraries in the public transit network.

Although the above defined set of feasible transfers is correct for any criterion given a fixed transfer speed, using the complete set of feasible transfers between trips during the search phase would not be beneficial because the above defined set of feasible transfers would be large and the non-useful arcs would negatively impact the exploration time (and hence the query time).

For instance, if all the possible transfers between one trip and a different line are considered, only transfer to the earliest trip (minimum trip regarding the line order) would be relevant for queries building the Pareto front for minimizing the arrival time and number of transfers and one solution per element in the Pareto front if the transfer speed and the maximum transfer time are fixed.

One approach to diminish the negative impact on the query times is to prune the set of feasible transfers while keeping all the transfers that belong to at least one optimal path per value in the Pareto front.

An example of an arrival time based pruning method for preprocessing a set of feasible transfers, as illustrated in FIG. 7, is proposed in Witt's Trip-Based Public Transit Routing Article.

In the description below, an arrival time based pruning method is any method for pruning a set of feasible transfers based on comparing arrival times at stations and/or change times at stations (minimum time at which it will be possible to take a new trip).

As shown in the example of arrival time pruning method in FIG. 7, each trip t is processed in turn, and each stop i of its sequence, starting by the last one. The process determines if taking a neighboring trip u at stop j, leaving t at stop i, can improve the arrival ($\tau_A$) or change ($\tau_C$) times at any stop of the network, compared to the previous transfers processed.

If leaving t at stop i and taking u at stop j can improve the arrival ($\tau_A$) or change ($\tau_C$) time at any stop of the network, the transfer is kept.

If leaving t at stop i and taking trip u at stop j cannot improve the arrival ($\tau_A$) or change ($\tau_C$) times at any stop of the network, the transfer is dropped because either the transfer cannot be part of any optimal solution or taking a later transfer or transferring to another trip will lead to at least as good arrival and/or change times.

The above pruning method reduces the query time, which in turns reduces the time needed to provide the user with a set of possible itineraries.

If the number of transfers in the built set of feasible transfers is reduced, the processing time in the search phase is reduced. For example, the preprocessing step, described in FIG. 7, reduces the transfer set in way that ensures that for each element in the Pareto set, at least one solution with this value can be constructed using transfers from the reduced set. However, the preprocessing phase for the process illustrated in FIG. 7 is costly because computing all the possible arrival and change times for all the reachable stops for each transfer is costly (in terms of execution times). Hence, applying another faster pruning phase, as discussed below, that removes some transfers before applying pruning of FIG. 7 can reduce the preprocessing computation times.

An example of a line-based transfer set building and pruning is disclosed in co-pending U.S. patent application Ser. No. 16/853,914, and illustrated in FIG. 8. The entire content of U.S. patent application Ser. No. 16/853,914 is hereby incorporated by reference.

Similarly to transfers between trips, it is possible to define possible transfers between lines. In that case, trip departure times are not considered, but only the definition of transfer duration between stops of the lines, i.e.; $\exists (i,j) \in [1 \ldots | \vec{p}(L)|-1] \times [0 \ldots | \vec{p}(L')|-2]$, $\Delta_{\tau_{fp}}(L@i, L'@j)$ is defined.

It is noted that a transfer is not performed from the first stop of a trip or to the last stop of a trip.

In particular, in the algorithm of FIG. 8, in procedure LINE_TRANSFER, all the transfers from line to line are generated and a transfer from line L at its $i^{th}$ stop to line L' at its $j^{th}$ stop is saved with using the triplet (i, L'@j, $\Delta \tau_{fp}$(L@i, L'@j)). Those transfers are then advantageously sorted by target line, decreasing origin line index and increasing target line index. Any sorting can then be used to break ties.

In its pruning phase, the algorithm illustrated in FIG. 8 considers each pair (origin trip, target line) and prune the corresponding transfers. The pruning is based on a Pareto dominance relation between transfers t@i→u@j with the criteria: origin index i, with should be the highest, target line index j, which should be the lowest, destination trip u, which should be the lowest.

The obtained algorithm builds a correct set of transfers for the criteria to minimize arrival time and number of transfers. A correct set of transfers is such that for each value in the Pareto front, there is at least one solution in the Pareto set with this value such that all the transfers of this solution belong to the transfer set.

Other pruning processes that ensure the correction of the transfer set may include a process based upon line-based U-turn removal; and a process based upon two stops from the origin line enabling a transfer to the same stop of the target line.

In the first pruning process (line-based U-turn removal), if transfer (i, L'@j, $\Delta \tau_{fp}$(L@i, L'@j)) is defined for a line L, and L'@(j+1)=L@(i−1), transfer (i, L'@j, $\Delta \tau_{fp}$(L@i, L'@j)) can be removed from the set of feasible transfers if for all trip t of L, wherein t' is the earliest trip from L' that can be caught at j after $\tau_{arr}(t,i)+\Delta \tau_{fp}$(L@i, L'@j), $$\tau_{arr}(t,i-1)+\Delta\tau_{fp}(L@(i-1),L'@(j+1))<\tau_{arr}(t',j+1)$$

It is true if:

$$\tau_{arr}(t,i-1)+\Delta\tau_{fp}(L@(i-1),L'@(j+1))<(\tau_{arr}(t',j+1)-\tau_{dep}(t',j))+\tau_{arr}(t,i)+\Delta\tau_{fp}(L@i,L'@j)$$

The following condition is sufficient:

$$\Delta\tau_{fp}(L@(i-1), L'@(j+1)) < \min_{t \in L}\{\tau_{arr}(t, i) - \tau_{arr}(t, i-1)\} + \min_{t' \in L'}\{\tau_{arr}(t', j+1) - \tau_{dep}(t', j)\} + \Delta\tau_{fp}(L@i, L'@j)$$

The following condition is also sufficient and can be checked in a computationally efficient manner:

$$\Delta\tau_{fp}(L@(i-1),L'@(j+1))\leq\Delta\tau_{fp}(L@i,L'@j)$$

Figure 5:
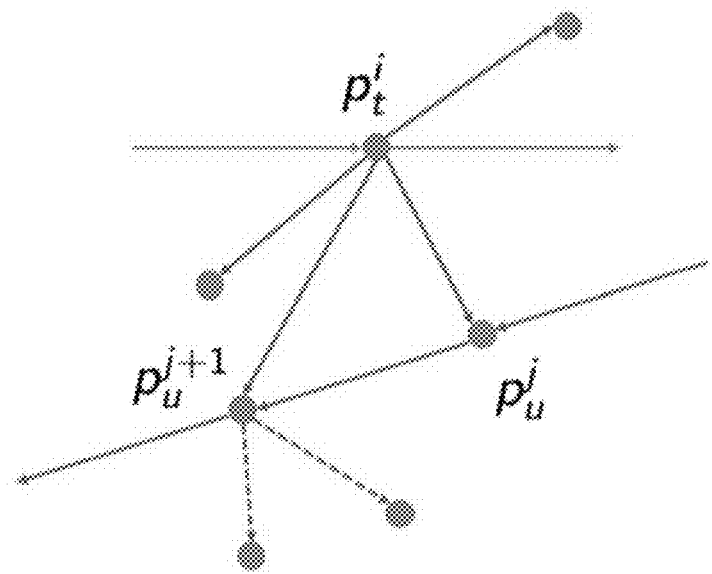
FIG. 5 is a graphical representation illustrating stops that can be reached by walking from a current stop or from the stops reached after a transfer.

For example, FIG. 5 shows stops that may be reached from stop $p_t^i$ by either walking and/or transferring to stops $p_u^{j+1}$ or $p_u^j$.

Figure 6:
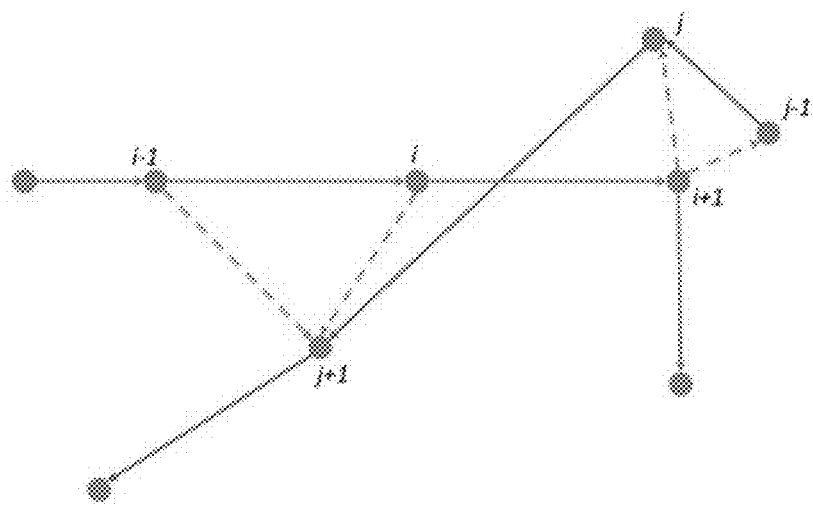
FIG. 6 is a graphical representation illustrating transfers between two lines.

In the second pruning process (two stops, i−1 and i, from the origin line [i−2 to i+2] enabling a transfer, j+1, to the same stop of the target line [j−1 to j+2] as illustrated in FIG. 6), if transfers (i, L'@j, $\Delta \tau_{fp}$(L@i, L'@j)) and (k, L'@j, $\Delta \tau_{fp}$(L@k, L'@j)) are defined for a line L, with k>i, transferring from L@i rather than from L@k can be interesting only if transferring from L@i makes it possible to catch an earlier trip than transferring at L@k (otherwise, only the transfer from L@k is kept). For a given origin trip t of L, it will not be the case if $\tau_{arr}(t,k)+\Delta\tau_{fp}(L@k, L'@j)\leq\tau_{arr}(t,i)+\Delta\tau_{fp}(L@i, L'@j)$. Hence transfer (i, L'@j, $\Delta \tau_{fp}$(L@i, L'@j)) can be pruned if:

$$\max_{t \in L}(\tau_{arr}(t, k) - \tau_{arr}(t, i)) + \Delta\tau_{fp}(L@k, L'@j) \leq \Delta\tau_{fp}(L@i, L'@j)$$

It is noted that more complicated pruning methods can be implemented based on maximum and minimum times between two stops of a line over the different trips, such as comparing transfers where both origin and destination indices are different.

As a second preprocessing step, the arrival time base transfer pruning, as discussed above with respect to FIG. 7, can be applied. Since the first preprocessing step of FIG. 8, has created an initial transfer set that is smaller, this second preprocessing step will be significantly less expensive computationally than with the complete transfer set and total preprocessing time is reduced.

Based on a correct transfer set and the associated search graph, routing algorithms can be designed to find the Pareto front and one solution with this value per element in the Pareto front for one or more criteria.

FIG. 9 illustrates the earliest arrival time query algorithm proposed in Witt's Trip-Based Public Transit Routing Article.

Earliest arrival time queries start with an initialization phase where the set of lines L from which the destination can be reached and the set of the earliest trips that can be reached from origin are computed.

$$\mathcal{L} = \{(L,i0)|(L,i) \in L(p_{tgt})\} \cup \{(L,i,\Delta\tau_{fp}(q,p_{tgt}))|(L,i) \in L(q) \wedge q \text{ is a neighbor of } p_{tgt}\}$$

The lines of L will be the targets of the algorithm while the search queue is initialized with the earliest trip of each line reached from origin.

The index R(t) of the first reached stop of trip t, initialized to ∞ for all trips, is maintained. For each number of transfers, one queue $Q_n$ of trip segments reached after n transfers is defined.

$Q_0$ is initialized from the trips that can be taken from the source stop $p_{src}$. Given a start time τ, for any stop q reached by walking from $p_{src}$ ($\Delta\tau_{fp}(p_{src},q)$ is defined), the earliest trip of (L i)∈L(q) is added to the queue. It is the smallest trip t of line L such that $$\tau_{dep}(t, i) \leq \begin{cases} \tau & \text{if } q = p_{src} \\ \tau + \Delta\tau_{fp}(p_{src}, q) & \text{otherwise} \end{cases}$$

Note that it is possible to consider an origin in the road network if duration between this origin and neighboring stations can be computed, for instance using a classical shortest path algorithm in the road network.

After the initialization, the process performs a breadth-first search. For each iteration, the process scans the trips in the queue. Each trip is scanned in turn. If the trip belongs to the target lines, the trip is compared to the current solution set. Then the transfers from this trip are added to the queue of the next iteration.

A more detailed description of this process is provided in FIG. 9.

Profile queries are also considered, where in addition to source and target stops, the user provides an earliest departure time $\tau_{edt}$ and a latest departure time $\tau_{ldt}$; i.e., an interval in which to depart. Maximum departure time is considered a third criterion in the Pareto search. The result of the query is the set of all the Pareto values for minimum arrival time, minimum number of transfers, and maximum departure time starting within the interval (and one itinerary per value).

The computation for profile queries is as follows: perform an earliest arrival time query starting at $\tau_{ldt}$ and add the Pareto values to the result set of the profile search. Then restart the search starting at the preceding instant without resetting the labels. By iterating the process, the Pareto front can be completed without performing unnecessary computations as the labels will only allow improvements on preceding arrival times.

As noted above, it desirable to provide a process that allows a user to personalize the routing generating routine to take into account desired parameters, unique to the user. More specifically, it is desirable to provide a process that allows a user to set a personalized maximum time for a transfer and/or set a personalized transfer speed while keeping the optimality of the results of the queries.

Figure 4:
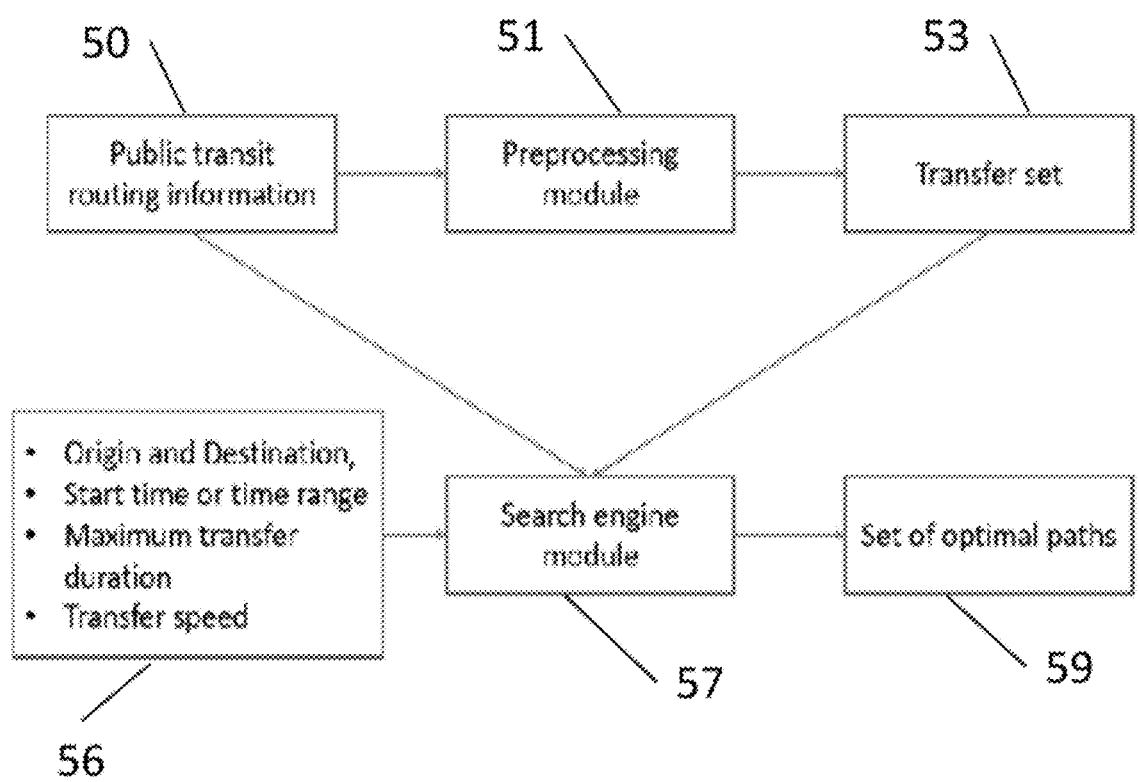
FIG. 4 illustrates a block diagram of a public transit routing process based on feasible transfers preprocessing that allows selection of a maximum transfer duration and a transfer speed.

FIG. 4 illustrates the public transit routing process proposed in this invention that allows a user to set a personalized maximum time for a transfer and/or set a personalized transfer speed. As illustrated in FIG. 4, the public transit routing process utilizes a database 50 containing public transit routing information for a particular area, such as a city. A preprocessing process 51 constructs a set of feasible transfers between trips in the public transit network.

As Illustrated in FIG. 4, a preprocessing process 51 prunes the set of feasible transfers between trips in the public transit network (e.g., using the first preprocessing step and a second preprocessing step described above with reference to FIGS. 7 and 8, respectively) to obtain a reduced transfer set 53. The preprocessing and pruning of the possible transfers between trips build, for each trip, a neighborhood of reachable trips that will be as small as possible. The building process and pruning process 51 ensure a correct set of transfers.

Figure 2:
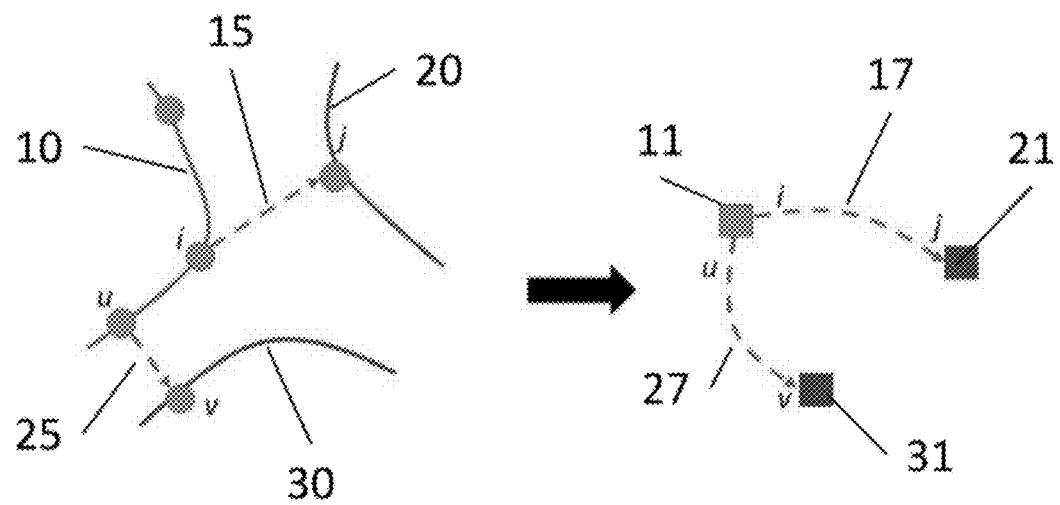
FIG. 2 illustrates an example of a data model for public transit networks where trips are represented as nodes and feasible transfers are represented as arcs.

Referring again to FIG. 4, a search engine module 57 finds the Pareto front and one solution per element in the Pareto front 59 by performing an earliest arrival time query that consists in a breadth-first search like exploration in a time-independent network (e.g., using the embodiment illustrated in FIG. 9 of the earliest arrival time query algorithm proposed in Witt's Trip-Based Public Transit Routing Article for a limited set of user definable parameters) where the trips 10, 20, and 30 are the nodes 11, 21 and 31, respectively, of FIG. 2 and the possible transfers 15 and 25 are the arcs 17 and 27, respectively, of FIG. 2. So, for each iteration, one additional trip is taken in each solution to try and get to destination.

Figure 3:
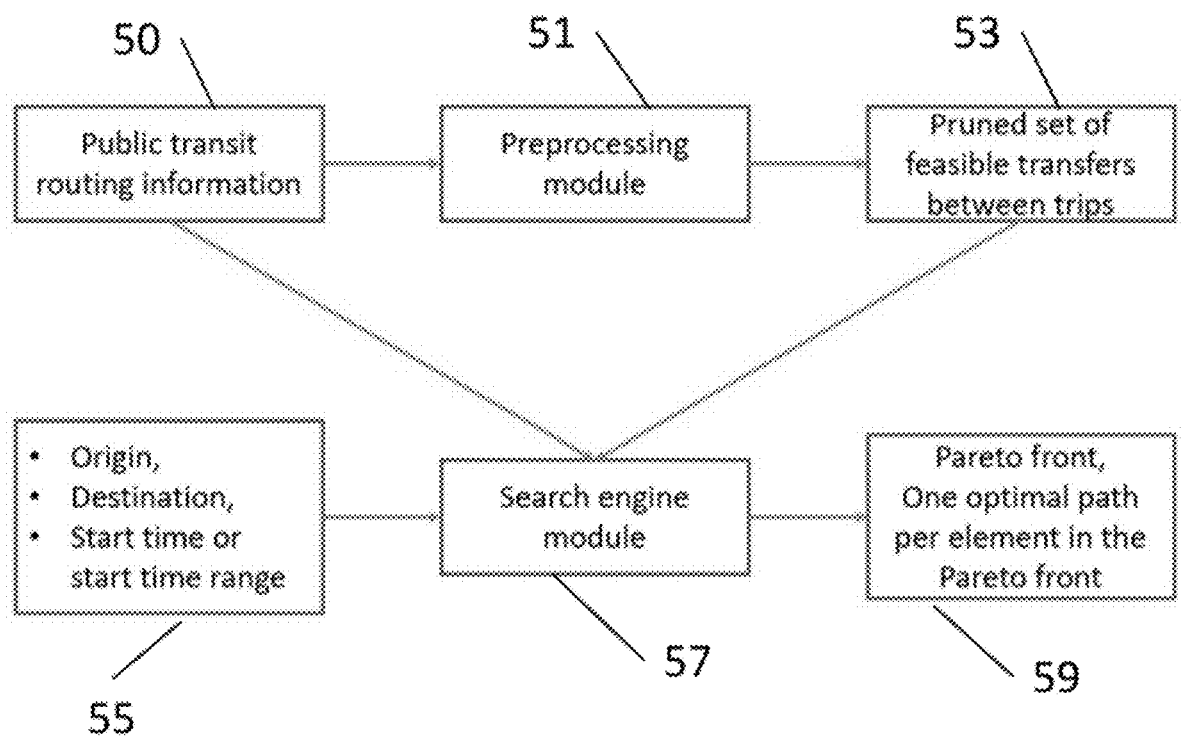
FIG. 3 illustrates a block diagram of a public transit routing process based on feasible transfers preprocessing.

Advantageously, in the embodiment illustrated in FIG. 4, a user is enabled to define a larger set of parameters 56 then the set of parameters 55 of the embodiment illustrated in FIG. 3. The parameters 56 include origin (which is also referred to herein as departure location), destination (which is also referred to herein as arrival location), start time or time range which are mandatory, and maximum transfer duration (which is also referred to herein a system maximum transfer time), and transfer speed (which is also referred to herein as a transfer duration coefficient) which are optional parameters (with default values). The parameters maximum transfer duration and transfer speed will be discussed in more detail below.

The method proposed is based on the Trip-Based Public Transit Routing algorithm. However, the Trip-Based Public Transit Routing algorithm is not compatible with the addition of a maximum transfer duration parameter, nor with the addition of a user defined transfer speed.

To enable the personalization of the route search, the query phase 57 and the preprocessing phase 51 need to be modified to ensure a correct result and reduce any impact on the overall processing time.

As noted above with reference to FIG. 4, in the preprocessing phase 51, feasible transfers are first computed, and then pruned with an arrival time based pruning in order to reduce the query times. Advantageously, instead of the transfer generation step proposed in the Trip-Based Public Transit Routing algorithm (which is also referred to herein as the standard version), it is possible to extend the version disclosed in co-pending U.S. patent application Ser. No. 16/853,914, as illustrated on FIG. 8.

The arrival time based pruning can then be applied or not, as the obtained feasible transfer set is already of reduced size.

Consider first the feasible transfer generation. Actually, in the standard version, not all the feasible transfers are generated. When considering transfer t@i→L'@j from a trip t to a line L'@$L_t$, it is considered that the user will take the first trip of L' that will arrive after the user has reached stop L'@j. Hence only the transfer to that trip is added to the set of feasible transfers.

When considering multiple possible speeds, there might be several transfers of interest for a given origin trip toward a given destination line, instead of a single earliest trip. The smallest destination trip to consider is the earliest one that can be reached with the fastest possible speed. The last is the earliest one that can be reached with the slowest speed. An embodiment of a method, adapted to take these considerations into account, is illustrated on FIG. 15.

In the embodiment illustrated on FIG. 15, all the trips in between the origin and destination can be taken, depending on the chosen transfer speed, and each is the transfer of interest for a given speed range. In the case where there is a finite set of possible speed values, not all the trips of the range might be relevant, and only the earliest for each given speed of the set (so at most as many trips as there are speeds) will be considered.

For each feasible transfer described above, in the transfer set, the tuple $(t@i \rightarrow u@j, \Delta\tau_{fp}(t@i, u@j), \sigma_{max})$ is saved, where $\sigma_{max}$ is the maximum transfer duration coefficient such that the transfer is feasible.

Note that if this set is used directly in the query phase, the results will be correct, as all the transfers that can appear in an optimal solution will be in the set. However, as will be explained below, the execution phase would be much longer.

Consider the arrival time based pruning of the transfer set. In the standard version, a transfer might be removed from the set of possible transfers if previously scanned transfers allow for reaching the same stops at the same or an earlier time. As the transfers are scanned starting from the end of the origin line, later transfers are kept in case of identical arrival times.

Moreover, consider the possibility to disable some transfers according to maximal duration or if speed customization makes the transfer time too long to reach the destination trip before it leaves. Applying the same pruning will not be correct, as a trip can be removed because the same stop has been reached for instance by a trip with a longer transfer duration (which could be pruned while the current trip is not).

As a consequence, for each tentative arrival time at a stop, the transfer distance and minimum speed, for which the transfer is feasible, needs to be considered. Also, comparing arrival time is made more difficult by the speed variability.

All arrival times, during preprocessing, have a speed independent component corresponding to the arrival time of a trip at one stop of its sequence. Then, there is the possibility to reach additional stations, with a duration that is dependent of speed. Simply comparing the sum of the two is not correct, as the variable part will be divided by a speed coefficient.

Hence, the stops are marked with a bag of tuples instead of a single value. Each tuple indicates the arrival time, fixed and variable parts, and maximum transfer duration and minimum speed coefficient for transfer to be feasible, as illustrated on FIG. 13.

Alternatively, the maximal duration coefficient can be used instead of minimum speed coefficient, and standard transfer duration (transfer duration considering a reference speed) can be used instead of maximum transfer duration for the transfer to be feasible.

The label $(arr_f, arr_v, \Delta\tau, \sigma_{max})$ is a tuple such that $arr_f$ is the fixed arrival time part, $\Delta\tau$ is the duration with reference speed, $arr_v$ is the variable arrival time part with standard speed, and $\sigma_{max}$ is the maximum transfer duration coefficient.

Figure 13:
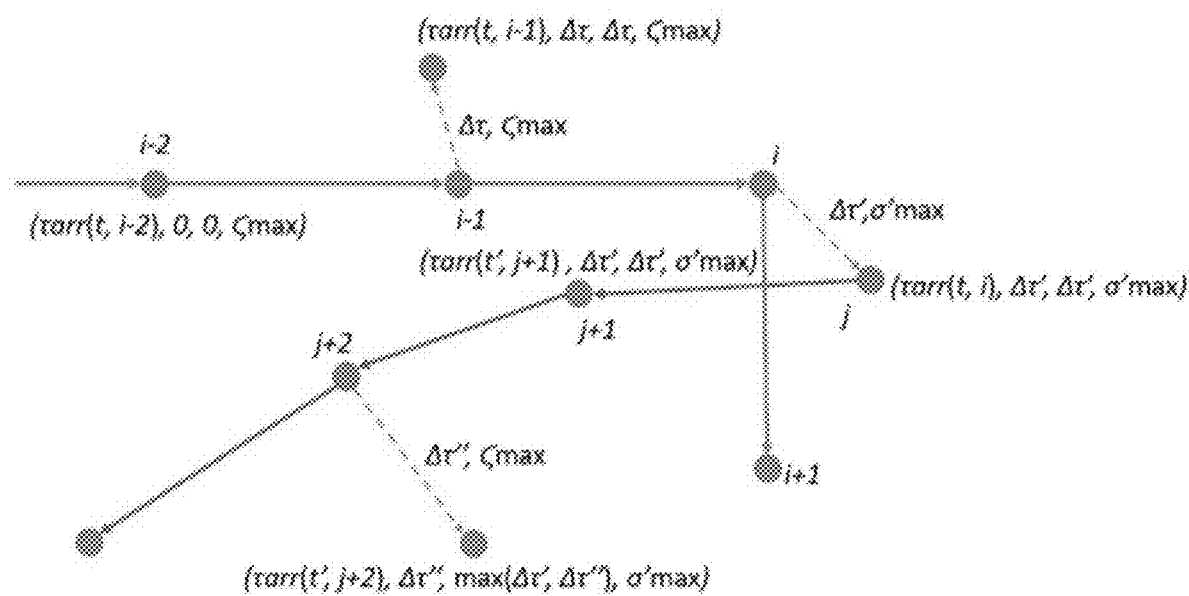
FIG. 13 is a graphical representation illustrating labelling for an origin trip and a destination trip in the preprocessing step.

FIG. 13 illustrates such labels in the context of a transfer between a trip t and a trip t'.

Even if the arrival time with the current transfer is always later than that of a previous transfer, it is not sufficient to say that the current transfer can never be useful. It could be useful if, for instance, the current transfer distance is lower (as the previous transfer could be removed by the maximum transfer duration constraint) or if the minimum speed allowed is lower (as the previous transfer could be removed by changing the speed). For a transfer never to improve arrival times at a stop (and hence its tuple value $(arr_f, arr_v, \Delta\tau, \sigma_{max})$ to be dominated), there needs to exist one value $(arr'_f, arr'_v, \Delta\tau', \sigma'_{max})$ in the label bag for this stop such that:
(1) $\sigma'_{max} \leq \sigma_{max}$;
(2) $\Delta\tau' \leq \Delta\tau$;
(3) and for any duration coefficient $\alpha$ such that both transfers are defined, $$arr'_f + arr'_v \times \sigma \leq arr_f + arr_v \times \sigma.$$

Condition (1) and (2) correspond to classical Pareto dominance. Condition (3) correspond to arrival time dominance, but must be valid for all possible speeds. It is equivalent to:

$$(arr'_f - arr_f)/\sigma \leq arr_v - arr'_v.$$

for all possible values of transfer duration coefficient $\sigma$, as it is non negative. In particular, the above condition is true if it is true for the minimum value $\varsigma_{min}$ that transfer duration coefficient $\alpha$ can take, obtaining the following conditions for label dominance:

$$\sigma'_{max} \leq \sigma_{max} \quad (1)$$

$$\Delta\tau' \leq \Delta\tau \quad (2)$$

$$(arr'_f - arr_f)/\varsigma_{min} \leq arr_v - arr'_v. \quad (3)$$

For each stop, a bag of all the non-dominated tuples is maintained to compare with new entries. A transfer is only kept if the transfer updated the label bag of at least one stop, its entry being non-dominated and not equivalent to those present in the label bag.

Note that in the case where possible speeds are only within a small discrete set (for instance slow, standard, fast), it is possible to save one label bag per stop and speed and use simpler labels with arrival time (computed for the given speed) and standard transfer duration (or transfer duration computed for the given speed). Each transfer is feasible for a subset of the speeds and can hence update the label bags for each of those speeds.

Figure 12:
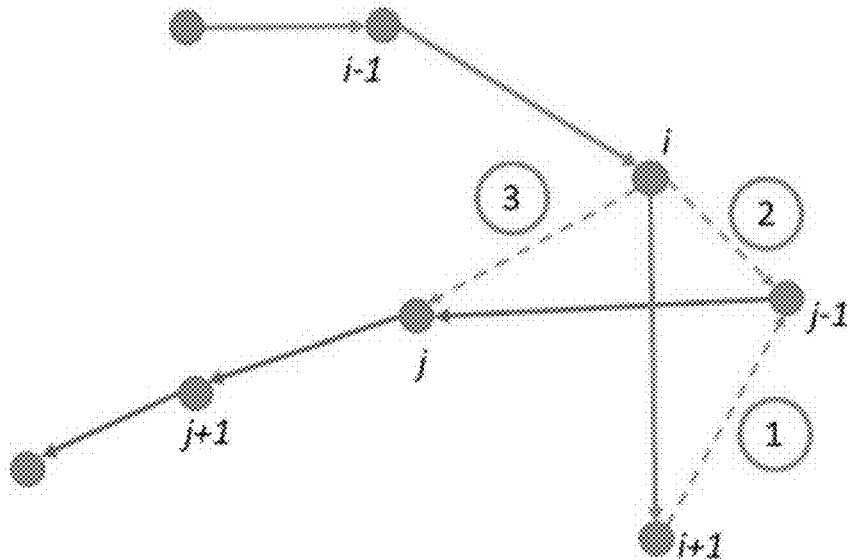
FIG. 12 is a graphical representation illustrating transfers from one origin trip of an origin line to a destination line.

For example, as illustrated in FIG. 12, suppose that the transfers from a trip t of line L to a line L' are being computed. Line L is the line having stops i−1, i, and i+1, and line L' is the line having stops j−1, j, and j+1.

Transfer (1) from L@(i+1) to L'@(j−1) will be considered.

As opposed to the conventional process, all the possible earliest trips, given the different possible speeds, are computed. If $s_{max}$ is the maximum speed to consider, $s_{min}$ the lowest and $s_{std}$ the reference speed, the maximum transfer duration coefficient $\varsigma_{max}$ is $(s_{std}/s_{min})$ and the minimum transfer duration coefficient $\varsigma_{min}$ is $(s_{max}/s_{std})$. The possible trips of L taken after the transfer are all the trips between the earliest trip such that $$\tau_{dep}(t',j-1) \geq \tau_{arr}(t,i+1) + \varsigma_{min} \times \Delta_{fp}(L@(i+1), L'@(j-1))$$

and the earliest trip such that $$\tau_{dep}(t',j-1) \geq \tau_{arr}(t,i+1) + \varsigma_{max} \times \Delta_{fp}(L@(i+1), L'@(j-1))$$

If only a finite set of possible speeds are considered, only the earliest trips corresponding to possible speeds will be considered.

For each of those trips, in the transfer set, the standard transfer duration and the maximum transfer duration coefficient $\sigma_{max} \leq \varsigma_{max}$, for which they will be feasible, can be saved.

The stops of L' can be marked by the arrival time of each trip, starting from the earliest, the same standard transfer duration and increasing maximum transfer duration coefficients. Note that those labels are not dominated and are hence all kept.

Considering transfer (2) from FIG. 12, suppose that the same set of trips of L' can be reached as with transfer (1). In the conventional process, transfer to the earliest trip would have been pruned, as it cannot lead to better arrival time.

However, if variable maximum transfer duration and distance, and if $\Delta\tau_{fp}(L@(i), L'@(j-1)) < \Delta\tau_{fp}(L@(i+1), L'@(j-1))$ are to be considered, those transfers will be kept as the transfers are not dominated by the previous ones.

On the other hand, if transfer (3) can only get access to the same destination trips, all the corresponding transfers could be removed if $\Delta\tau_{fp}(L@(i),L'@(j-1)) < \Delta\tau_{fp}(L@(i),L'@(j))$ as the labels will be dominated (same arrival trips, longer standard duration, worst maximum transfer duration coefficient).

FIG. 13 show some of the tentative labels set by a single transfer between a trip t and a trip t'.

First the transfers that are reached directly from stops of t are marked with the fixed part of arrival time, variable part of arrival time, transfer time, and the maximum transfer duration coefficient. Since it is not known which trip will be taken next, only the maximum transfer duration coefficient $\varsigma_{max}$ can be used.

Note also that after transferring from trip t, the stops reached by transfer from trip t' are marked by the fixed part of arrival time, variable part of arrival time, maximum transfer time, minimum duration coefficient, and maximum transfer duration coefficient. In fact, when considering a path with several trips, it will be feasible for a given maximum transfer time constraint only if all its transfers are faster than the bound.

Similarly, if a duration coefficient value is provided, the path will be feasible if and only if all the maximum transfer duration coefficients are below a given bound.

FIG. 14 illustrates an embodiment of this pruning phase. Note that minimum change times are also checked. They are given similar labels with the hypothesis that they are also multiplied by a duration coefficient when speed varies.

In the transfer set generation based on lines, the main modification is the generation of several destination trips for transfers between an origin line and a destination line (see FIG. 15). The dominance rule of the transfers of the transfer set now needs to look at two additional criteria: the transfer duration (to minimize) and the transfer duration coefficient (to maximize).

Note that it would be possible to use system level maximum transfer duration to prune further the transfer set (some transfer to later trips would not be generated).

As noted above, the query phase (e.g., performed at 57 in FIG. 4) needs to be modified to implement the personalization of the route search process.

Given that after preprocessing (e.g., performed at 51 in FIG. 4), as described above, a correct set of transfers is obtained for whichever maximum speed value and whichever maximum transfer duration is set by the user within the system level bounds for those values.

To avoid performing any transfer above maximum duration, pruning is performed, at query time, in order to remove the transfers for which duration exceeds the bound. For this, and unlike in the conventional algorithm illustrated in FIG. 9, the duration must be an attribute of the transfer. To facilitate the pruning, either the standard duration (if it is desired to add a maximum transfer duration as a parameter) or equivalently the transfer distance (if a speed is provided as a parameter) is saved.

For variable speed, the same idea can be applied with modification.

A transfer is valid if it is feasible at current speed. Saving the minimum speed for which the transfer is feasible will hence enable pruning during the search. Equivalently, if standard duration is associated to transfer, a maximum transfer duration coefficient can be added to transfer information. It would be possible to add a maximum speed (respectively, minimum duration coefficient) for which the transfer can be useful.

Consider the case where possible speed values are from a discrete set. In this case, a speed mask can be added to transfers in order to keep only the right ones depending on the speed during the query phase.

FIG. 10 and FIG. 11 illustrate the modified query phase (e.g., performed at 57 in FIG. 4). In the transfer set, for each transfer $t@i \to u@j$, the standard duration $\Delta\tau$ and a maximum transfer duration coefficient $\sigma_{max}$ for which the transfer is valid are saved to obtain a tuple ($t@i \to u@j$, $\Delta\tau$, $\sigma_{max}$). A user can input a user defined maximum transfer duration $\Delta\tau_{max}$ and transfer duration coefficient $\sigma$ (relative to the standard duration) in addition to source and destination stops and departure time.

Note that although it is not the case, as illustrated in FIG. 11, it would be possible to bound the travel duration from origin to the first stop or from the last stop to destination by pruning $Q_0$ and L according to a user defined value (possibly different to $\Delta\tau_{max}$).

Since a correct transfer set for earliest arrival time queries is correct for latest departure time queries, the same modifications could be applied to latest departure time queries in order to integrate maximum duration and variable transfer speed.

It is also possible to extend to consider the case of non-scheduled lines, as disclosed in co-pending U.S. patent application Ser. No. 16/830,621 with similar modifications. Boarding and alighting times could similarly be added for all lines. The entire content of U.S. patent application Ser. No. 16/830,621 is hereby incorporated by reference.

In the case of scheduled mode selection as disclosed in co-pending U.S. patent application Ser. No. 16/830,609, the process can be extended in a similar fashion if preprocessing is also modified. The entire content of U.S. patent application Ser. No. 16/830,609 is hereby incorporated by reference.

The user personalized processes, described above, were executed upon two data sets. The first data set covers the Région Ile-De-France and is provided by IDFM (Ile-De-France Mobilités). The second data set is provided by Naver Map and contains public transportation information for Korea. Table 1 of FIG. 16 illustrates the data sets, and Table 2 of FIG. 16 illustrates the preprocessing of the first data set (IDFM) with maximum 10 min transfer time.

Note that for the Korean network, a limited number of footpaths are provided, while for the IDFM network, the number of footpaths may vary, depending on the maximum transfer duration used to generate missing footpaths from the data set. To compare results on both data sets, the IDFM network was generated with maximum transfer duration of 10 minutes (maximum transfer duration of the Korean data set).

As an example of the testing of the user personalized processes, described above, three different speeds (slow: 2 kph, standard: 4 kph, and fast: 6 kph) were allowed. The maximum duration for a transfer is its duration at "standard" speed multiplied by $\varsigma_{max}$=2, and the minimum duration for a transfer is its duration at "standard" speed multiplied by $\varsigma_{min}$=2/3.

In the preprocessing, the addition of speed categories in the code was tested. As explained above, not a single transfer from each origin trip and index pair to each reachable line and index pair should be considered, but several. The total number of feasible transfers is increased (see Table 2 of FIG. 16 and Table 4 of FIG. 16, wherein Table 4 illustrates the preprocessing for Korean data set with maximum 10 min transfer time). As a consequence, the preprocessing is more computationally expensive and more transfers need to be pruned.

The final number of transfers for each speed (see Table 3 of FIG. 16, wherein Table 3 illustrates the preprocessing of the IDFM data set with maximum 10 min transfer time at each speed level, and Table 5 of FIG. 16, wherein Table 5 illustrates the preprocessing of the Korean data set with maximum 10 min transfer time at each speed level) varies as expected, as more transfers are feasible for "fast" speed and less for "slow" speed than for the "standard" speed. Also, enabling the maximum transfer duration constraints increases the number of transfers that are not pruned.

Note that preprocessing times for maximum duration and variable speed are much increased compared to the standard version. Label bag updating is much more expensive than taking the minimum between two arrival times.

For each data set, one hundred origin-destination pairs from stop to stop were randomly generated. The earliest arrival time queries and one-hour profile queries were run starting at 8.30 am (rush hour is the densest in term of number of trips, so that is when the queries are longer).

Table 6 of FIG. 17 and Table 8 of FIG. 18 illustrate the execution times and number of solutions for the different versions of the process. As expected, using appropriate transfer structure with speed mask, the execution times are not impacted by the existence of several speeds instead of one. The execution times are similar to that of the standard code without any modifications as the number of transfers is not very different. It is noted that to reduce the execution time by a third in the conventional approach, the number of transfers removed is 9 out of 10 in the conventional approach.

When adding the possibility to set maximum duration (see Table 7 of FIG. 17 and Table 9 of FIG. 18), the number of transfers is multiplied by 1.6 for IDFM. It is a small factor, and very similar computation times are observed. However, for Korea, although the number of transfers is only multiplied by a factor 1.4, the execution time is multiplied by two for standard speed. It can be a consequence of network structure (more neighbors added in the dense Seoul area than in the rest of the network).

The above-described methods extend the Trip Based Public Transit Routing algorithm to compute personalized itineraries in a multimodal network based on custom transfer speed and maximum transfer duration. The customization is done at query time and requires only one server for any speed and maximum transfer duration within chosen bounds. Alternatively, the user could choose a speed from a set provided by the application. The method modifies the pruning phase of the Trip Based Public Transit Routing algorithm to obtain Pareto front for minimizing arrival time and number of transfers.

The Trip Based Public Transit Routing algorithm requires that the transfer times and maximum transfer times are fixed and identical for all users as they are used in the preprocessing as constant values. The above described extension allows for the possibility to change maximum transfer duration at query time and to modify transfer speeds while ensuring the optimality of the results. Transfer speed and maximal duration personalization is a relevant feature in many contexts (traveling with children, with heavy luggage, bad weather, etc.). Those skilled in the art will appreciate that aspects of the methods described with reference to FIG. 4 may be incorporated in whole or in part in the methods described with reference to FIG. 3.

As disclosed above, a method builds a reduced set of feasible transfers between public transit trips based upon transfer times between stations, and a system maximum transfer time $\Delta_{max}$ that can be finite or infinite by (a) computing, for each origin line L, and for each destination line L', a set of transfers τ (L, L') between stations of the origin line and stations of the destination line such that the transfer time from the station of the origin line to the station of the destination line is lower than the system maximum transfer time $\Delta_{max}$; (b) determining, for each trip t of origin line L, and for each transfer (L@i→L'@j, A$\tau_{fp}$(L@i, L'@j)) in the transfer set τ (L, L'), an earliest trip t' wherein $\Delta \tau_{fp}$ is a transfer duration associated with the displacement between two stops, t@i and t'@j, and wherein the transfer (t@i→t'@j, A $\tau_{fp}$(L@i, L'@j)) is feasible when the arrival time $\tau_{arr}$ (t,i) at stop t@i plus the transfer duration $\Delta\tau_{fp}$ is less than or equal to the departure time $\tau_{dep}$ (t',j) at stop t'@j; (c) adding the transfer (t@i→t'@j, Δτ) to a reduced set of feasible transfers τ (t, L') from trip t to trips of L' when the transfer (t@i→t'@j, Δτ) is not dominated in the Pareto sense based on the criteria: destination trip t', which should be the lowest, origin trip index i, which should be the highest, destination trip index j, which should be the lowest, and transfer duration Δτ, which should be the lowest; and (d) removing transfers from the reduced set of feasible transfers τ (t, L') if they are dominated in the Pareto sense based on the criteria: destination trip t', which should be the lowest, origin trip index i, which should be the highest, destination trip index j, which should be the lowest, and transfer duration Δτ, which should be the lowest.

The method further (e) removes, before determining the earliest trip t' of L' wherein the transfer (t@i→t'@j, $\Delta\tau_{fp}$ (L@i, L'@j)) is feasible, a transfer (L@i→L'@j, $\Delta\tau_{fp}$(L@i, L'@j)) from the set of transfers T (L, L') when $\Delta\tau_{fp}$(L@(i-1), L'@(j+1))≤$\Delta\tau_{fp}$(L@i, L'@j) and L@(i-1)=L'@(j+1).

The method further (e) prunes the reduced set of feasible transfers T (t)=$U_L$T(t, L') of feasible transfers based on Pareto dominance for the criteria: arrival time at stations, which should be the lowest, and transfer duration, which should be the lowest, at all stops reached by performing the transfers and by transferring from one of the reached stations to another station within the system maximum transfer time Δmax.

The method further (f) prunes the reduced set of feasible transfer T (t)=$U_L$T(t, L') of feasible transfers based on Pareto dominance for the criteria: arrival time at stations, which should be the lowest, and transfer duration, which should be the lowest, at all stops reached by performing the transfers and by transferring from one of the reached stations to another station within the system maximum transfer time Δmax.

A method for computing at least one customized itinerary from a departure location to an arrival location based upon a user specified maximum transfer time that is lower than a system maximum transfer time Δmax which can be finite or infinite, (a) inputs, by a user, a user specified departure location, a user specified arrival location, a user specified departure time, and a user specified maximum transfer time that is lower than the system maximum transfer time Δmax; (b) computes, for each origin line L, and for each destination line L', a set of transfers T (L, L') between stations of the origin line and stations of the destination line such that the transfer time from the station of the origin line to the station of the destination line is lower than the system maximum transfer time Δmax; (c) determines, for each trip t of origin line L, and for each transfer (L@i→L'@j, $\Delta\tau_{fp}$(L@i, L'@j)) in the transfer set T (L, L'), an earliest trip t' of L' wherein the transfer (t@i→t'@j, $\Delta\tau_{fp}$(L@i, L'@j)) is feasible; (d) adds the transfer (t@i→t'@j, Δτ) to a reduced set of feasible transfers T (t, L') from trip t to trips of L' when the transfer (t@i→t'@j, Δτ) is not dominated in the Pareto sense based on the criteria: destination trip t', which should be the lowest, origin trip index i, which should be the highest, destination trip index j, which should be the lowest, and transfer duration Δτ, which should be the lowest; (e) removes transfers from the reduced set of feasible transfers T (t, L') if they are dominated in the Pareto sense based on the criteria: destination trip t', which should be the lowest, origin trip index i, which should be the highest, destination trip index j, which should be the lowest, and transfer duration Δτ, which should be the lowest; (f) determining a set of possible initial trips as a set of pairs (trip t, station index i) such that the station t@i of the trip t is reachable from the origin location and trip t is the earliest trip of its line that can be boarded at its $i^{th}$ stop given the departure time and the displacement duration between the origin and t@i; (g) determining, a set of possible final trips as a set of pairs (destination trip t, station index i) such that the arrival location is reachable from t@i; and (h) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t)=$U_L$.T(t, L') such that the transfer duration is less or equal to the user inputted maximum transfer time.

The routing optimization algorithm may compute a Pareto front according to the criteria earliest arrival time and minimum number of transfers.

The departure time inputted at (a) may be replaced by a user inputted arrival time, the initial trips being defined at (f) as the latest trips from the stations of which the destination can be reached before the user inputted arrival time, the final trips being defined at (g) as the trips that can be reached from the destination, and the routing optimization algorithm computing the Pareto front according to latest departure time and minimum number of transfers performing a backward search.

The routing optimization algorithm may compute one optimal solution per element in the Pareto front.

The routing optimization algorithm may compute an optimal solution per element in the Pareto front.

The method further (i) removes, before determining the earliest trip t' of L' wherein the transfer (t@i→t'@j, $\Delta\tau_{fp}$(L@i, L'@j)) is feasible, a transfer (L@i→L'@j, $\Delta\tau_{fp}$(L@i, L'@j)) from the set of transfers T (L, L') when $\Delta\tau_{fp}$(L@(i−1), L'@(j+1))≤$\Delta\tau_{fp}$(L@i, L'@j) and L@(i−1)=L'@(j+1).

The method further (i) prunes the reduced set of feasible transfer T (t)=$U_L$.T(t, L') of feasible transfers based on Pareto dominance for the criteria: arrival time at stations, which should be the lowest, and transfer duration, which should be the lowest, at all stops reached by performing the transfers and by transferring from one of the reached stations to another station within the system maximum transfer time Δmax.

The method further (j) prunes the reduced set of feasible transfer T (t)=$U_L$.T(t, L') of feasible transfers based on Pareto dominance for the criteria: arrival time at stations, which should be the lowest, and transfer duration, which should be the lowest, at all stops reached by performing the transfers and by transferring from one of the reached stations to another station within the system maximum transfer time Δmax.

A method for building a set of transfers between public transit trips based upon transfer times between stations, a minimum transfer duration coefficient $\zeta_{min}$ and a maximum transfer duration coefficient $\zeta_{max}$, (a) computes, for each origin line L, and for each destination line L', a set of transfers T (L, L') between stations of the origin line and stations of the destination line such that the transfer time from the station of the origin line to the station of the destination line is defined; (b) determining, for each trip t of origin line L, and for each transfer (L@i→L'@j, Δτ) in the transfer set T (L, L'), an earliest trip $t'_{min}$ of L' wherein the transfer is feasible with transfer duration coefficient $\zeta_{min}$, and an earliest trip $t'_{max}$ of L' wherein the transfer is feasible with transfer duration coefficient $\zeta_{max}$; (c) for each trip t' of [$t'_{min}$, $t'_{max}$], computes the maximum transfer duration coefficient $\sigma_{max}$ such that the transfer t@i→t'@j is feasible; (d) adds transfer (t@i→t'@j, $\Delta\tau_{fp}$(L@i, L'@j), $\sigma_{max}$) to a reduced set of transfers T (t, L') from trip t to trips of L' when the transfer (t@i→t'@j, $\Delta\tau_{fp}$(L@i, L'@j), $\sigma_{max}$) is not dominated in the Pareto sense based on the criteria: destination trip t', which should be the lowest, origin trip index i, which should be the highest, destination trip index j, which should be the lowest, and maximum transfer duration coefficient $\sigma_{max}$, which should be the highest; and (e) removes transfers from the reduced set of feasible transfers T (t, L') if they are dominated in the Pareto sense based on the criteria: destination trip t', which should be the lowest, origin trip index i, which should be the highest, destination trip index j, which should be the lowest, and maximum transfer duration coefficient $U_{max}$, which should be the highest.

The method further (f) removes, before determining the earliest trip t' of L' wherein the transfer (t@i→t'@j, $\Delta\tau_{fp}$(L@i, L'@j), $\sigma_{max}$) is feasible, a transfer (L@i→L'@j, $\Delta\tau_{fp}$(L@i, L'@j)) from the reduced set of transfers T (L, L') when $\Delta\tau_{fp}$(L@(i−1), L'@(j+1))≤$\Delta\tau_{fp}$(L@i, L'@j) and L@(i−1)=L'@(j+1).

The method further (f) prunes the reduced set of transfers T (t)=$U_L$.T(t, L') of feasible transfers based on a dominance relation for arrival time at stations and transfer duration coefficient at all stops reached by performing the transfers and by transferring from one of the reached stations to another station such that a label ($arr_f$, $arr_v$, $\sigma_{max}$) at a stop, with $arr_f$ being the fixed part of the arrival time at the stop, $arr_v$ being the variable part of the arrival time at the stop, and $\sigma_{max}$ being the maximum transfer duration coefficient for which the transfer is feasible, is dominated by a label ($arr'_f$, $arr'_v$, $\sigma'_{max}$) if $$\sigma'_{max} \le \sigma_{max} \tag{1}$$

$$\frac{arr'_f - arr_f}{\zeta_{min}} \le arr_v - arr'_v. \tag{2}$$

The method further (f) prunes the reduced set of transfers $T(t)=U_L.T(t, L')$ of feasible transfers based on a dominance relation for arrival time at stations and transfer duration coefficient at all stops reached by performing the transfers and by transferring from one of the reached stations to another station such that a label ($arr_f$, $arr_v$, $\sigma_{max}$) at a stop, with $arr_f$ being the fixed part of the arrival time at the stop, $arr_v$ being the variable part of the arrival time at the stop, and $\sigma_{max}$ being the maximum transfer duration coefficient for which the transfer is feasible, is dominated by a label ($arr'_f$, $arr'_v$, $\sigma'_{max}$) if $$\sigma'_{max} \leq \sigma_{max} \quad (1)$$

$$\frac{arr'_f - arr_f}{\zeta_{min}} \leq arr_v - arr'_v. \quad (2)$$

A method computes at least one customized itinerary from a departure location to an arrival location, based on a minimum transfer duration coefficient $\zeta_{min}$ and a maximum transfer duration coefficient $\zeta_{max}$, by (a) computing, for each origin line L, and for each destination line L', a set of transfers T (L, L') between stations of the origin line and stations of the destination line such that the transfer time from the station of the origin line to the station of the destination line is defined; (b) determining, for each trip t of origin line L, and for each transfer (L@i→L'@j, Δτ) in the transfer set T (L, L'), an earliest trip $t'_{min}$ of L' wherein the transfer is feasible with transfer duration coefficient $\zeta_{min}$, and an earliest trip $t'_{max}$ of L' wherein the transfer is feasible with transfer duration coefficient $\zeta_{max}$; (c) for each trip t' of [$t'_{min}$, $t'_{max}$], computing the maximum transfer duration coefficient σ such that the transfer t@i→t'@j is feasible; (d) adding transfer (t@i→t'@j, $\Delta\tau_{fp}$(L@i, L'@j), $\sigma_{max}$) to a reduced set of transfers T (t, L') from trip t to trips of L' when the transfer (t@i→t'@j, $\Delta\tau_{fp}$(L@i, L'@j), $\sigma_{max}$) is not dominated in the Pareto sense based on the criteria: destination trip t', which should be the lowest, origin trip index i, which should be the highest, destination trip index j, which should be the lowest and maximum transfer duration coefficient $\sigma_{max}$, which should be the highest; (e) removing transfers from the reduced set of feasible transfers T (t, L') if they are dominated in the Pareto sense based on the criteria: destination trip t', which should be the lowest, origin trip index i, which should be the highest, destination trip index j, which should be the lowest, and maximum transfer duration coefficient $\sigma_{max}$, which should be the highest; (f) inputting, by a user, a user specified departure location, a user specified arrival location, a user specified departure time, and a user specified transfer duration coefficient in the interval [$\zeta_{min}$, $\zeta_{max}$]; (g) determining a set of possible initial trips as a set of pairs (trip t, station index i) such that the station t@i of the trip t is reachable from the origin location and trip t is the earliest trip of its line that can be boarded given the departure time and the displacement duration between the origin and t@i; (h) determining a set of possible final trips as a set of pairs (destination trip t, station index i) such that the arrival location is reachable from t@i; and (i) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers $T(t)=U_L.T(t, L')$.

The routing optimization algorithm computes the Pareto front according to earliest arrival time and minimum number of transfers.

The departure time inputted at (a) is replaced by a user inputted arrival time, the initial trips being defined at (f) as the latest trips from the stations of which the destination can be reached before the user inputted arrival time, the final trips being defined at (g) as the trips that can be reached from the destination, and the routing optimization algorithm computing the Pareto front according to latest departure time and minimum number of transfers performing a backward search.

The routing optimization algorithm computes an optimal solution per element in the Pareto front.

The routing optimization algorithm computes an optimal solution per element in the Pareto front.

The method further (j) removes, before determining the earliest trip t' of L' wherein the transfer (t@i→t'@j, $\Delta\tau_{fp}$(L@i, L'@j)) is feasible, a transfer (L@i→L'@j, $\Delta\tau_{fp}$(L@i, L @j)) from the reduced set of transfers T (L, L') when $\Delta\tau_{fp}$(L@(i−1), L@(j+1))≤$\Delta\tau_{fp}$(L@i, L'@j) and L@(j−1)=L@(j+1).

The method further (i) prunes the reduced set of transfers $T(t)=U_L.T(t, L')$ of feasible transfers based on a dominance relation for arrival time at stations and transfer duration coefficient at all stops reached by performing the transfers and by transferring from one of the reached stations to another station such that a label ($arr_f$, $arr_v$, $\sigma_{max}$) at a stop, with $arr_f$ being the fixed part of the arrival time at the stop, $arr_v$ being the variable part of the arrival time at the stop, and $\sigma_{max}$ being the maximum transfer duration coefficient for which the transfer is feasible, is dominated by a label ($arr'_f$, $arr'_v$, $\sigma'_{max}$) if $$\sigma'_{max} \leq \sigma_{max} \quad (1)$$

$$\frac{arr'_f - arr_f}{\zeta_{min}} \leq arr_v - arr'_v. \quad (2)$$

The method further (f) prunes the reduced set of transfers $T(t)=U_L.T(t, L')$ of feasible transfers based on a dominance relation for arrival time at stations and transfer duration coefficient at all stops reached by performing the transfers and by transferring from one of the reached stations to another station such that a label ($arr_f$, $arr_v$, $\sigma_{max}$) at a stop, with $arr_f$ being the fixed part of the arrival time at the stop, $arr_v$ being the variable part of the arrival time at the stop, and $\sigma_{max}$ being the maximum transfer duration coefficient for which the transfer is feasible, is dominated by a label ($arr'_f$, $arr'_v$, $\sigma'_{max}$) if $$\sigma'_{max} \leq \sigma_{max} \quad (1)$$

$$\frac{arr'_f - arr_f}{\zeta_{min}} \leq arr_v - arr'_v. \quad (2)$$

A method builds a set of transfers between public transit trips based upon transfer times between stations, a system maximum transfer time Δmax that can be finite or infinite, and a minimum transfer duration coefficient $\zeta_{min}$ and a maximum transfer duration coefficient $\zeta_{max}$, by (a) computing, for each origin line L, and for each destination line L', a set of transfers T (L, L') between stations of the origin line and stations of the destination line such that the transfer time from the station of the origin line to the station of the destination line is less or equal to $\Delta max \times \zeta_{max}$; (b) determining, for each trip t of origin line L, and for each transfer (L@i→L'@j, $\Delta\tau_{fp}$(L@i, L'@j)) in the transfer set T (L, L'), an earliest trip $t'_{min}$ of L' wherein the transfer is feasible with transfer duration coefficient $\zeta_{min}$, and an earliest trip $t'_{max}$ of L' wherein the transfer is feasible with transfer duration coefficient $\zeta_{max}$; (c) for each trip t' of [$t'_{min}$, $t'_{max}$], computing a maximum transfer duration coefficient σmax such that transfer t@i→t'@j is feasible; (d) adding transfer (t@i→t'@j, Δτ, σmax) to a reduced set of transfers T (t, L') from trip t to trips of L' when_the transfer (t@i→t'@j, Δτ, σmax) is not dominated in the Pareto sense based on the criteria: destination trip t', which should be the lowest, origin trip index i, which should be the highest, destination trip index j, which should be the lowest, standard transfer time Δτ, which should be the lowest and maximum transfer duration coefficient $\sigma_{max}$, which should be the highest; and (e) removing transfers from the reduced set of feasible transfers T (t, L') if they are dominated in the Pareto sense based on the criteria: destination trip t', which should be the lowest, origin trip index i, which should be the highest, destination trip index j, which should be the lowest, standard transfer time Δτ, which should be the lowest, and maximum transfer duration coefficient $\sigma_{max}$, which should be the highest.

The method further (f) removes, before determining the earliest trip t' of L' wherein the transfer (t@i→t'@j, $\Delta\tau_{fp}$ (L@i, L'@j), σmax) is feasible, a transfer (L@i→L'@j, $\Delta\tau_{fp}$(L@i, L'@j)) from the reduced set of transfers T (L, L') when $\Delta\tau_{fp}$(L@(i-1), L'@(j+1))≤$\Delta\tau_{fp}$(L@i, L'@j) and L@(i-1)=L'@(j+1).

The method further (f) prunes the reduced set of feasible transfers T (t)=U$_L$.T(t, L') based on a dominance relation for arrival time at stations and transfer duration coefficient at all stops reached by performing the transfers and by transferring from one of the reached stations to another station within $\Delta max \times \zeta_{max}$ such that a label (arr$_f$, arr$_v$, Δτ, $\sigma_{max}$) at a stop, with arr$_f$ the fixed part of the arrival time at the stop, arr$_v$ the variable part of the arrival time at the stop, Δτ the standard transfer duration and $\sigma_{max}$ the maximum transfer duration coefficient for which the transfer is feasible, is dominated by a label (arr'$_f$, arr'$_v$, Δτ', σ'$_{max}$) if $$\sigma'_{max} \le \sigma_{max} \quad (1)$$

$$\Delta\tau' \le \Delta\tau \quad (2)$$

$$\frac{arr'_f - arr_f}{\zeta_{min}} \le arr_v - arr'_v. \quad (3)$$

The method further (g) prunes the reduced set of feasible transfers T (t)=U$_L$.T(t, L') based on a dominance relation for arrival time at stations and transfer duration coefficient at all stops reached by performing the transfers and by transferring from one of the reached stations to another station within $\Delta max \times \zeta_{max}$ such that a label (arr$_f$, arr$_v$, Δτ, $\sigma_{max}$) at a stop, with arr$_f$ the fixed part of the arrival time at the stop, arr$_v$ the variable part of the arrival time at the stop, Δτ the standard transfer duration and $\sigma_{max}$ the maximum transfer duration coefficient for which the transfer is feasible, is dominated by a label (arr'$_f$, arr'$_v$, Δτ', σ'$_{max}$) if $$\sigma'_{max} \le \sigma_{max} \quad (1)$$

$$\Delta\tau' \le \Delta\tau \quad (2)$$

$$\frac{arr'_f - arr_f}{\zeta_{min}} \le arr_v - arr'_v. \quad (3)$$

A method computes at least one customized itinerary from a departure location to an arrival location based upon a user specified maximum transfer time lower than or equal to a system maximum transfer time Δmax that can be finite or infinite and a maximum transfer coefficient chosen within a range [$\zeta_{min}$, $\zeta_{max}$] of possible values, by (a) computing, for each origin line L, and for each destination line L', a set of transfers T (L, L') between stations of the origin line and stations of the destination line such that the transfer time from the station of the origin line to the station of the destination line is less or equal to $\Delta max \times \zeta_{max}$; (b) determining, for each trip t of origin line L, and for each transfer (L@i→L'@j, $\Delta\tau_{fp}$(L@i, L'@j)) in the transfer set T (L, L'), an earliest trip $t'_{min}$ of L' wherein the transfer is feasible with transfer duration coefficient $\zeta_{min}$, and an earliest trip $t'_{max}$ of L' wherein the transfer is feasible with transfer duration coefficient $\zeta_{max}$; (c) for each trip t' of [$t'_{min}$, $t'_{max}$], computing a maximum transfer duration coefficient σmax such that transfer t@i→t'@j is feasible; (d) adding transfer (t@i→t'@j, Δτ, σmax) to a reduced set of transfers T (t, L') from trip t to trips of L' when_the transfer (t@i→t'@j, Δτ, σmax) is not dominated in the Pareto sense based on the criteria: destination trip t', which should be the lowest, origin trip index i, which should be the highest, destination trip index j, which should be the lowest, standard transfer time Δτ, which should be the lowest and maximum transfer duration coefficient $\sigma_{max}$, which should be the highest; (e) removing transfers from the reduced set of feasible transfers T (t, L') if they are dominated in the Pareto sense based on the criteria: destination trip t', which should be the lowest, origin trip index i, which should be the highest, destination trip index j, which should be the lowest, standard transfer time Δτ, which should be the lowest, and maximum transfer duration coefficient $\sigma_{max}$, which should be the highest; (f) inputting, by a user, a user specified departure location, a user specified arrival location, a user specified departure time, a user specified transfer duration coefficient in the range [$\zeta_{min}$, $\zeta_{max}$], and a user specified maximum transfer time less or equal to the system maximum transfer duration Δmax; (g) determining a set of possible initial trips as a set of pairs (trip t, station index i) such that the station t@i of the trip t is reachable from the origin location and trip t is the earliest trip of its line that can be boarded given the departure time and the displacement duration between the origin and t@i; (h) determining a set of possible final trips as a set of pairs (destination trip t, station index i) such that the arrival location is reachable from t@i; and (i) performing a routing optimization algorithm so as to build, among itineraries having a main part from an initial trip belonging to the set of possible initial trips to a final trip belonging to the set of possible final trips, an itinerary, when considering only transfers from the reduced set of feasible transfers T (t)=U$_L$.T(t, L') such that the maximum transfer duration coefficient is greater than the user specified coefficient and the transfer duration is less than the user inputted maximum transfer time.

The routing optimization algorithm computes a Pareto front according to earliest arrival time and minimum number of transfers.

The departure time inputted at (a) is replaced by a user inputted arrival time, the initial trips being defined at (f) as the latest trips from the stations of which the destination can be reached before the user inputted arrival time, the final trips being defined at (g) as the trips that can be reached from the destination, and the routing optimization algorithm computing the Pareto front according to latest departure time and minimum number of transfers performing a backward search.

The routing optimization algorithm computes one optimal solution per element in the Pareto front.

The routing optimization algorithm computes one optimal solution per element in the Pareto front.

The method further (f) removes, before determining the earliest trip t' of L' wherein the transfer (t@i→t'@j, Δτ) is feasible, a transfer (L@i→L'@j, Δτ) from the reduced set of transfers T (L, L') when $\Delta\tau_{fp}$(L@(i−1), L @(j+1)) $\Delta\tau_{fp}$(L@i, L'@j) and L@(i−1)=L'@(j+1).

The method further (f) prunes the reduced set of feasible transfers T (t)=$U_L$.T(t, L') based on a dominance relation for arrival time at stations and transfer duration coefficient at all stops reached by performing the transfers and by transferring from one of the reached stations to another station within $\Delta max \times \zeta_{max}$ such that a label (arr$_f$, arr$_v$, Δτ, $\sigma_{max}$) at a stop, with arr$_f$ the fixed part of the arrival time at the stop, arr$_v$ the variable part of the arrival time at the stop, Δτ the standard transfer duration and $\sigma_{max}$ the maximum transfer duration coefficient for which the transfer is feasible, is dominated by a label (arr'$_f$, arr'$_v$, Δτ', σ'$_{max}$) if $$\sigma'_{max} \le \sigma_{max} \quad (1)$$

$$\Delta\tau' \le \Delta\tau \quad (2)$$

$$\frac{arr'_f - arr_f}{\zeta_{min}} \le arr_v - arr'_v. \quad (3)$$

The method further (g) prunes the reduced set of feasible transfers T (t)=$U_L$.T(t, L') based on a dominance relation for arrival time at stations and transfer duration coefficient at all stops reached by performing the transfers and by transferring from one of the reached stations to another station within $\Delta max \times \zeta_{max}$ such that a label (arr$_f$, arr$_v$, Δτ, $\sigma_{max}$) at a stop, with arr$_f$ the fixed part of the arrival time at the stop, arr$_v$ the variable part of the arrival time at the stop, Δτ the standard transfer duration and $\sigma_{max}$ the maximum transfer duration coefficient for which the transfer is feasible, is dominated by a label (arr'$_f$, arr'$_v$, Δτ', σ'$_{max}$) if $$\sigma'_{max} \le \sigma_{max} \quad (1)$$

$$\Delta\tau' \le \Delta\tau \quad (2)$$

$$\frac{arr'_f - arr_f}{\zeta_{min}} \le arr_v - arr'_v. \quad (3)$$

A method builds a set of transfers between public transit trips based upon transfer times between stations, a set of possible transfer duration coefficients {$\zeta_1, \zeta_2, \ldots \zeta_m$}, by (a) computing, for each origin line L, and for each destination line L', a set of transfers T (L, L') between stations of the origin line and stations of the destination line such that the transfer time from the station of the origin line to the station of the destination line is defined; (b) determining, for each trip t of origin line L, and for each transfer (L@i→L'@j, Δτ) in the transfer set T (L, L'), an earliest trip t'k of L' wherein the transfer is feasible for each possible transfer duration coefficient $\zeta_k$; (c) for each trip t'k of L' wherein t'k is the earliest trip of L' such that the transfer t@i→t'$_k$@j is feasible for transfer duration coefficient $\zeta_k$, adding transfer (t@i→t'$_k$@j, $\Delta\tau_{fp}$(L@i, L'@j), $\zeta_k$) to reduced set of transfers T (t, L', k) from trip t to trips of L' for transfer duration coefficient $\zeta_k$ when transfer (t@i→t'$_k$@j, $\Delta\tau_{fp}$(L@i, L'@j), $\zeta_k$) is not dominated in the Pareto sense based on criteria: destination trip t', which should be the lowest, origin trip index i, which should be the highest, and destination trip index j, which should be the lowest; and (d) removing transfers from the reduced set of feasible transfers T (t, L', k) if they are dominated in the Pareto sense based on the criteria: destination trip t', which should be the lowest, origin trip index i, which should be the highest and destination trip index j, which should be the lowest.

The method further (e) removes, before determining the earliest trip t' of L' wherein the transfer (t@i→t'@j, Δτ, $\zeta_k$) is feasible, a transfer (L@i→L'@j, Δτ) from the reduced set of transfers T (L, L', k) for all k when $\Delta\tau_{fp}$(L@(i−1), L'@(j+1))≤$\Delta\tau_{fp}$(L@i, L'@j) and L@(i−1)=L'@(j+1).

The sets T (t, L', k) are computed in transfer duration coefficient increasing order and a next set of transfers is initialized containing a set for a previous transfer duration coefficient.

The sets T (t, L', k) are computed in transfer duration coefficient increasing order and a next set of transfers is initialized containing a set for a previous transfer duration coefficient.

The method further (e) prunes transfer set T (t, k)=$U_L$.T(t, L', k) of feasible transfers for transfer duration coefficient $\zeta_k$ based on arrival time at stations that should be minimal at all stops reached by performing the transfers and by transferring from one of the reached stations to another station.

The method further (f) prunes transfer set T (t, k)=$U_L$.T(t, L', k) of feasible transfers for transfer duration coefficient $\zeta_k$ based on arrival time at stations that should be minimal at all stops reached by performing the transfers and by transferring from one of the reached stations to another station.

The method further (e) prunes transfer set T (t, k)=$U_L$.T(t, L', k) of feasible transfers for transfer duration coefficient $\zeta_k$ based on arrival time at stations that should be minimal at all stops reached by performing the transfers and by transferring from one of the reached stations to another station.

The method further (f) prunes transfer set T (t, k)=$U_L$.T(t, L', k) of feasible transfers for transfer duration coefficient $\zeta_k$ based on arrival time at stations that should be minimal at all stops reached by performing the transfers and by transferring from one of the reached stations to another station.

A method computes at least one customized itinerary from a departure location to an arrival location based upon a user specified transfer duration coefficient chosen within a set of possible transfer duration coefficients {$\zeta_1, \zeta_2, \ldots \zeta_m$}, by (a) computing, for each origin line L, and for each destination line L', a set of transfers T (L, L') between stations of the origin line and stations of the destination line such that the transfer time from the station of the origin line to the station of the destination line is defined; (b) determining, for each trip t of origin line L, and for each transfer (L@i→L'@j, Δτ) in the transfer set T (L, L'), an earliest trip t'$_k$ of L' wherein the transfer is feasible for each possible transfer duration coefficient $\zeta_k$; (c) for each trip t'$_k$ of L' wherein t'k is the earliest trip of L' such that the transfer t@i→t'k@j is feasible for transfer duration coefficient $\zeta_k$, adding transfer (t@i→t'k@j, $\Delta\tau_{fp}$(L@i, L'@j), $c_k$) to reduced set of transfers T (t, L', k) from trip t to trips of L' for transfer duration coefficient $\zeta_k$ when transfer (t@i→t'$_k$@j, $\Delta\tau_{fp}$(L@i, L'@j), $\zeta_k$) is not dominated in the Pareto sense based on criteria: destination trip t', which should be the lowest, origin trip index i, which should be the highest, and destination trip index j, which should be the lowest; (d) removing transfers from the reduced set of feasible transfers T (t, L', k) if they are dominated in the Pareto sense based on the criteria: destination trip t', which should be the lowest, origin trip index i, which should be the highest and destination trip index j, which should be the lowest; (e) inputting, by a user, a user specified departure location, a user specified arrival location, a user specified departure time, and a user specified transfer duration coefficient among the set $\{\zeta_1, \zeta_2, \ldots \zeta_m\}$; (f) determining a set of possible initial trips as a set of pairs (trip t, station index i) such that the station t@i of the trip t is reachable from the origin location and trip t is the earliest trip of its line that can be boarded at its $i^{th}$ stop given the departure time and the displacement duration between the origin and t@i; (g) determining a set of possible final trips as a set of pairs (destination trip t, station index i) such that the arrival location is reachable from t@i; and (h) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, k)=$U_L$T(t, L', k) such that the associated maximum transfer duration coefficient is greater than the user inputted transfer duration coefficient $\zeta_k$.

The routing optimization algorithm computes a Pareto front according to earliest arrival time and minimum number of transfers.

The departure time inputted at (a) is replaced by a user inputted arrival time, the initial trips being defined at (f) as the latest trips from the stations of which the destination can be reached before the user inputted arrival time, the final trips being defined at (g) as the trips that can be reached from the destination, and the routing optimization algorithm computing the Pareto front according to latest departure time and minimum number of transfers performing a backward search.

The routing optimization algorithm computes an optimal solution per element in the Pareto front.

The routing optimization algorithm computes an optimal solution per element in the Pareto front.

The method further (i) removes, before determining the earliest trip t' of L' wherein the transfer (t@i→t'@j, Δτ, $\zeta_k$) is feasible, a transfer (L@i→L'@j, Δτ) from the reduced set of transfers T (L, L', k) when $\Delta\tau_{fp}$(L@(i-1), L'@(j+1))≤$\Delta\tau_{fp}$(L@i, L'@j) and L@(i-1)=L'@(j+1).

The sets T (t, L', k) are computed in transfer duration coefficient increasing order and a next set of transfers is initialized containing a set for a previous transfer duration coefficient.

The sets T (t, L', k) are computed in transfer duration coefficient increasing order and a next set of transfers is initialized containing a set for a previous transfer duration coefficient.

The method further (i) prunes transfer set T (t, k)=$U_L$T(t, L', k) of feasible transfers for transfer duration coefficient $\zeta_k$ based on arrival time at stations that should be minimal at all stops reached by performing the transfers and by transferring from one of the reached stations to another station.

The method further (j) prunes transfer set T (t, k)=$U_L$T(t, L', k) of feasible transfers for transfer duration coefficient $\zeta_k$ based on arrival time at stations that should be minimal at all stops reached by performing the transfers and by transferring from one of the reached stations to another station.

The method further (i) prunes transfer set T (t, k)=$U_L$T(t, L', k) of feasible transfers for transfer duration coefficient $\zeta_k$ based on Pareto dominance with criteria: arrival time at stations that should be the lowest at all stops reached by performing the transfers and by transferring from one of the reached stations to another station.

The method further (j) prunes transfer set T (t, k)=$U_L$T(t, L', k) of feasible transfers for transfer duration coefficient $\zeta_k$ based Pareto dominance with criteria: arrival time at stations that should be the lowest at all stops reached by performing the transfers and by transferring from one of the reached stations to another station.

A method builds a set of transfers between public transit trips based upon transfer times between stations, a set of possible transfer duration coefficients $\{\zeta_1, \zeta_2, \ldots \zeta_m\}$ and a system maximum transfer time Δmax that can be finite or infinite, by (a) computing, for each origin line L, and for each destination line L', a set of transfers T (L, L') between stations of the origin line and stations of the destination line such that the transfer time from the station of the origin line to the station of the destination line is less or equal to $\Delta max \times \zeta_{max}$; (b) determining, for each trip t of origin line L, and for each transfer (L@i→L'@j, Δτ) in the transfer set T (L, L'), an earliest trip t'k of L' wherein the transfer is feasible for each possible transfer coefficient $\zeta_k$; (c) for each trip t'k of L' wherein t'k is the earliest trip of L' wherein the transfer t@i→t'k@j is feasible for transfer duration coefficient $\zeta_k$, adding transfer (t@i→t'$_k$@j, Δτ, $\zeta_k$) to reduced set of transfers T (t, L', k) from trip t to trips of L' for transfer duration coefficient $\zeta_k$ when transfer (t@i→t'$_k$@j, Δτ, $\zeta_k$) is not dominated in a Pareto sense based on the criteria: destination trip t', which should be the lowest, origin trip index i, which should be the highest, destination trip index j, which should be the lowest, and standard transfer duration Δτ, which should be the lowest; and (d) removing transfers from the reduced set of feasible transfers T (t, L', k) if they are dominated in the Pareto sense based on the criteria: destination trip t', which should be the lowest, origin trip index i, which should be the highest, destination trip index j, which should be the lowest, and standard transfer duration Δτ, which should be the lowest.

The method further (e) removes, before determining the earliest trip t' of L' wherein the transfer (t@i→t'@j, Δτ, $\zeta_k$) is feasible, a transfer (L@i→L'@j, $\Delta\tau_{fp}$(L@i, L'@j)) from the reduced set of transfers T (L, L', k) when $\Delta\tau_{fp}$(L@(i-1), L'@(j+1))≤$\Delta\tau_{fp}$(L@i, L'@j) and L@(j-1)=L@(j+1).

The sets T (t, L', k) are computed in transfer duration coefficient increasing order and next set of transfers is initialized containing the set for the previous transfer duration coefficient.

The sets T (t, L', k) are computed in transfer duration coefficient increasing order and next set of transfers is initialized containing the set for the previous transfer duration coefficient.

The method further (e) prunes transfer set T (t, k)=$U_L$T(t, L', k) of feasible transfers for transfer duration coefficient $\zeta_k$ based on Pareto dominance for criteria arrival time at stations that should be the lowest and standard transfer duration that should be the lowest at all stops reached by performing the transfers and by transferring from one of the reached stations to another station.

The method further (f) prunes transfer set T (t, k)=$U_L$T(t, L', k) of feasible transfers for transfer duration coefficient $\zeta_k$ based on Pareto dominance for criteria arrival time at stations that should be the lowest and standard transfer duration that should be the lowest at all stops reached by performing the transfers and by transferring from one of the reached stations to another station.

The method further (e) prunes transfer set T (t, k)=$U_L$T(t, L', k) of feasible transfers for transfer duration coefficient $\zeta_k$ based on Pareto dominance for criteria arrival time at stations that should be the lowest and standard transfer duration that should be the lowest at all stops reached by performing the transfers and by transferring from one of the reached stations to another station.

The method further (f) prunes transfer set T (t, k)=$U_L$T(t, L', k) of feasible transfers for transfer duration coefficient $\zeta_k$ based on Pareto dominance for criteria arrival time at stations that should be the lowest and standard transfer duration that should be the lowest at all stops reached by performing the transfers and by transferring from one of the reached stations to another station.

A method computes at least one customized itinerary from a departure location to an arrival location based upon a user specified transfer duration coefficient chosen within a set of possible transfer duration coefficients $\{\zeta_1, \zeta_2, \ldots \zeta_m\}$, a user specified maximum transfer time lower than or equal to a system maximum transfer time $\Delta$max that can be finite or infinite, by (a) computing, for each origin line L, and for each destination line L', a set of transfers T (L, L') between stations of the origin line and stations of the destination line such that the transfer time from the station of the origin line to the station of the destination line is defined and lower than or equal to $\Delta$max×$\zeta_{max}$; (b) determining, for each trip t of origin line L, and for each transfer (L@i→L'@j, $\Delta\tau$) in the transfer set T (L, L'), an earliest trip t'k of L' wherein the transfer is feasible for each possible transfer coefficient $\zeta_k$; (c) for each trip t'k of L' wherein t'$_k$ is the earliest trip of L' such that the transfer t@i→t'k@j is feasible for transfer duration coefficient $\zeta_k$, adding transfer (t@i→t'k@j, $\Delta\tau$, $\zeta_k$) to reduced set of transfers T (t, L', k) from trip t to trips of L' for transfer duration coefficient $\zeta_k$ when transfer (t@i→t'k@j, $\Delta\tau$, $\zeta_k$) is not dominated in a Pareto sense based on the criteria: destination trip t', which should be the lowest, origin trip index i, which should be the highest, destination trip index j, which should be the lowest, and standard transfer duration $\Delta\tau$ which should be the lowest; (d) removing transfers from the reduced set of feasible transfers T (t, L', k) if they are dominated in the Pareto sense based on the criteria: destination trip t' which should be the lowest, origin trip index i, which should be the highest, destination trip index j, which should be the lowest, and standard transfer duration $\Delta\tau$ which should be the lowest; (e) inputting, by a user, a user specified departure location, a user specified arrival location, a user specified departure time, a user specified transfer duration coefficient among the set $\{\zeta_1, \zeta_2, \ldots \zeta_m\}$ and a user specified maximum transfer duration lower than or equal to the system maximum transfer time $\Delta$max; (f) determining a set of possible initial trips as a set of pairs (trip t, station index i) such that the station t@i of the trip t is reachable from the origin location and trip t is the earliest trip of its line that can be boarded at its $j^{th}$ stop given the departure time and the displacement duration between the origin and t@i; (g) determining a set of possible final trips as a set of pairs (destination trip t, station index i) such that the arrival location is reachable from t@i; and (h) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, k)=$U_L$T(t, L', k) such that the associated transfer duration coefficient is equal to the user inputted transfer duration coefficient $\zeta_k$ and the transfer duration, once applied the transfer duration coefficient, is lower than the user defined maximum transfer duration.

The routing optimization algorithm computes a Pareto front for earliest arrival time and minimum number of transfers.

The departure time inputted at (a) is replaced by a user inputted arrival time, the initial trips being defined at (f) as the latest trips from the stations of which the destination can be reached before the user inputted arrival time, the final trips being defined at (g) as the trips that can be reached from the destination, and the routing optimization algorithm computing the Pareto front according to latest departure time and minimum number of transfers performing a backward search.

The routing optimization algorithm computes one optimal solution per element in the Pareto front.

The routing optimization algorithm computes one optimal solution per element in the Pareto front.

The method further (i) removes, before determining the earliest trip t' of L' wherein the transfer (t@i→t'@j, $\Delta\tau$, $\zeta_k$) is feasible, a transfer (L@i→L'@j, $\Delta\tau$) from the reduced set of transfers T (L, L', k) when $\Delta\tau_{fp}$(L@(i−1), L'@(j+1)) $\Delta\tau_{fp}$(L@i, L'@j) and L@(i−1)=L'@(j+1).

The sets T (t, L', k) are computed in transfer duration coefficient increasing order and a next set of transfers is initialized containing a set for a previous transfer duration coefficient.

The sets T (t, L', k) are computed in transfer duration coefficient increasing order and the next set of transfers is initialized containing the set for the previous transfer duration coefficient.

The method further (i) prunes transfer set T (t, k)=$U_L$T(t, L',k) of feasible transfers for transfer duration coefficient $\zeta_k$ based on Pareto dominance for criteria arrival time at stations, that should be the lowest, and standard transfer duration, that should be the lowest, at all stops reached by performing the transfers and by transferring from one of the reached stations to another station.

The method further (j) prunes transfer set T (t, k)=$U_L$T(t, L',k) of feasible transfers for transfer duration coefficient $\zeta_k$ based on Pareto dominance for criteria arrival time at stations, that should be the lowest, and standard transfer duration, that should be the lowest, at all stops reached by performing the transfers and by transferring from one of the reached stations to another station.

The method further (i) prunes transfer set T (t, k)=$U_L$T(t, L',k) of feasible transfers for transfer duration coefficient $\zeta_k$ based on Pareto dominance for criteria arrival time at stations, that should be the lowest, and standard transfer duration, that should be the lowest, at all stops reached by performing the transfers and by transferring from one of the reached stations to another station.

The method further (j) prunes transfer set T (t, k)=$U_L$, T(t, L',k) of feasible transfers for transfer duration coefficient $\zeta_k$ based on Pareto dominance for criteria arrival time at stations, that should be the lowest, and standard transfer duration, that should be the lowest, at all stops reached by performing the transfers and by transferring from one of the reached stations to another station.

A method for building a reduced set of feasible transfers between public transit trips based upon transfer times between stations, and a system maximum transfer time $\Delta$max that can be finite or infinite, comprises (a) computing, for each origin line L, and for each destination line L', a set of transfers T (L, L') between stations of the origin line and stations of the destination line such that the transfer time from the station of the origin line to the station of the destination line is lower than the system maximum transfer time $\Delta$max; (b) determining, for each trip t of origin line L, and for each transfer (L@i→L'@j, $\Delta\tau_{fp}$(L@i, L'@j)) in the transfer set T (L, L'), an earliest trip t' of L' wherein $\Delta\tau_{fp}$ is a transfer duration associated with the displacement between two stops, t@i and t'@j, and wherein the transfer (t@i→t'@j, $\Delta\tau_{fp}$(L@i, L'@j)) is feasible when the arrival time $T_{arr}$ (t,i) at stop t@i plus the transfer duration $\Delta\tau_{fp}$ is less than or equal to the departure time $T_{dep}$ (t',j) at stop t'@j; (c) adding the transfer (t@i→t'@j, $\Delta\tau$) to a reduced set of feasible transfers T (t, L') from trip t to trips of L' when the transfer (t@i→t'@j, $\Delta\tau$) is not dominated in the Pareto sense based on the criteria: destination trip t', which should be the lowest, origin trip index i, which should be the highest, destination trip index j, which should be the lowest, and transfer duration $\Delta\tau$, which should be the lowest; and (d) removing transfers from the reduced set of feasible transfers T (t, L') if they are dominated in the Pareto sense based on the criteria: destination trip t', which should be the lowest, origin trip index i, which should be the highest, destination trip index j, which should be the lowest, and transfer duration $\Delta\tau$, which should be the lowest.

The method may further comprise (e) removing, before determining the earliest trip t' of L' wherein the transfer (t@i→t'@j, $\Delta\tau_{fp}$(L@i, L'@j)) is feasible, a transfer (L@i→L'@j, $\Delta\tau_{fp}$(L@i, L'@j)) from the set of transfers T (L, L') when $\Delta\tau_{fp}$(L@(i−1), L'@(j+1))≤$\Delta\tau_{fp}$(L@i, L'@j) and L@(i−1)=L'@(j+1).

The method may further comprise (e) pruning the reduced set of feasible transfers T (t)=$U_L$T(t, L') of feasible transfers based on Pareto dominance for the criteria: arrival time at stations, which should be the lowest, and transfer duration, which should be the lowest, at all stops reached by performing the transfers and by transferring from one of the reached stations to another station within the system maximum transfer time $\Delta$max.

The method may further comprise (e) computing at least one customized itinerary from a departure location to an arrival location based upon a user specified maximum transfer time that is lower than the system maximum transfer time $\Delta$max; the computing the at least one customized itinerary includes (e1) receiving a user specified departure location, a user specified arrival location, a user specified departure time, and a user specified maximum transfer time that is lower than the system maximum transfer time $\Delta$max, (e2) removing transfers from the reduced set of feasible transfers T (t, L') if they are dominated in the Pareto sense based on the criteria: destination trip t', which should be the lowest, origin trip index i, which should be the highest, destination trip index j, which should be the lowest, and transfer duration $\Delta\tau$, which should be the lowest, (e3) determining a set of possible initial trips as a set of pairs (trip t, station index i) such that the station t@i of the trip t is reachable from the departure location and trip t is the earliest trip of its line that can be boarded at its $i^{th}$ stop given the departure time and the displacement duration between the departure location and the station t@i, (e4) determining, a set of possible final trips as a set of pairs (destination trip t, station index i) such that the arrival location is reachable from the station t@i, and (e5) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t)=$U_L$T(t, L') such that the transfer duration is less or equal to the user inputted maximum transfer time.

The routing optimization algorithm may compute a Pareto front according to the criteria earliest arrival time and minimum number of transfers.

The departure time inputted at (e1) may be replaced by a user inputted arrival time, the initial trips being defined at (e3) as the latest trips from the stations of which the destination location can be reached before the user inputted arrival time, the final trips being defined at (e4) as the trips that can be reached from the destination, and the routing optimization algorithm computing the Pareto front according to latest departure time and minimum number of transfers performing a backward search.

The routing optimization algorithm may compute one optimal solution per element in the Pareto front.

A method for building a set of transfers between public transit trips based upon transfer times between stations, a minimum transfer duration coefficient $\zeta_{min}$ and a maximum transfer duration coefficient $\zeta_{max}$, comprises (a) computing, for each origin line L, and for each destination line L', a set of transfers T (L, L') between stations of the origin line and stations of the destination line such that the transfer time from the station of the origin line to the station of the destination line is defined; (b) determining, for each trip t of origin line L, and for each transfer (L@i→L'@j, $\Delta\tau$) in the transfer set T (L, L'), an earliest trip $t'_{min}$ of L' wherein the transfer is feasible with transfer duration coefficient $\zeta_{min}$, and an earliest trip $t'_{max}$ of L' wherein the transfer is feasible with transfer duration coefficient $\zeta_{max}$; (c) for each trip t' of [$t'_{min}$, $t'_{max}$], computing the maximum transfer duration coefficient $\sigma_{max}$ such that the transfer t@i→t'@j is feasible; (d) adding transfer (t@i→t'@j, $\Delta\tau_{fp}$(L@i, L'@i), $\sigma_{max}$) to a reduced set of transfers T (t, L') from trip t to trips of L' when the transfer (t@i→t'@j, $\Delta\tau_{fp}$(L@i, L'@f), $\sigma_{max}$) is not dominated in the Pareto sense based on the criteria: destination trip t', which should be the lowest, origin trip index i, which should be the highest, destination trip index j, which should be the lowest, and maximum transfer duration coefficient $\sigma_{max}$, which should be the highest; and (e) removing transfers from the reduced set of feasible transfers T (t, L') if they are dominated in the Pareto sense based on the criteria: destination trip t', which should be the lowest, origin trip index i, which should be the highest, destination trip index j, which should be the lowest, and maximum transfer duration coefficient $\sigma_{max}$, which should be the highest.

The method may further comprise (f) removing, before determining the earliest trip t' of L' wherein the transfer (t@i→t'@j, $\Delta\tau_{fp}$(L@i, L'@j), $\sigma_{max}$) is feasible, a transfer (L@i→L'@j, $\Delta\tau_{fp}$(L@i, L'@j)) from the reduced set of transfers T (L, L') when $\Delta\tau_{fp}$(L@(i−1), L'@(j+1)) $\Delta\tau_{fp}$(L@i, L'@j) and L@(i−1)=L'@(j+1).

The method may further comprise (f) pruning the reduced set of transfers T (t)=$U_L$T(t, L') of feasible transfers based on a dominance relation for arrival time at stations and transfer duration coefficient at all stops reached by performing the transfers and by transferring from one of the reached stations to another station such that a label (arr$_f$, arr$_v$, $\sigma_{max}$) at a stop, with arr$_f$ being the fixed part of the arrival time at the stop, arr$_v$ being the variable part of the arrival time at the stop, and $\sigma_{max}$ being the maximum transfer duration coefficient for which the transfer is feasible, is dominated by a label (arr'$_f$, arr'$_v$, $\sigma'_{max}$) if $$\sigma'_{max} \le \sigma_{max} \quad (1)$$

$$\frac{arr'_f - arr_f}{\zeta_{min}} \le arr_v - arr'_v. \quad (2)$$

The method may further comprise (f) computing at least one customized itinerary from a departure location to an arrival location, based on the minimum transfer duration coefficient $\zeta_{min}$ and the maximum transfer duration coefficient $\zeta_{max}$, the computing the at least one customized itinerary includes (f1) inputting, by a user, a user specified departure location, a user specified arrival location, a user specified departure time, and a user specified transfer duration coefficient in the interval [$\zeta_{min}$, $\zeta_{max}$], (f2) determining a set of possible initial trips as a set of pairs (trip t, station index i) such that the station t@i of the trip t is reachable from the origin location and trip t is the earliest trip of its line that can be boarded given the departure time and the displacement duration between the origin location and the station t@i, (f3) determining a set of possible final trips as a set of pairs (destination trip t, station index i) such that the arrival location is reachable from the station t@i, and (f4) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t)=$U_L$·T(t, L').

The routing optimization algorithm may compute the Pareto front according to earliest arrival time and minimum number of transfers.

The departure time inputted at (f1) may be replaced by a user inputted arrival time, the initial trips being defined at (f2) as the latest trips from the stations of which the destination can be reached before the user inputted arrival time, the final trips being defined at (f3) as the trips that can be reached from the destination, and the routing optimization algorithm computing the Pareto front according to latest departure time and minimum number of transfers performing a backward search.

The routing optimization algorithm may compute an optimal solution per element in the Pareto front.

A method for building a set of transfers between public transit trips based upon transfer times between stations, a system maximum transfer time Δmax that can be finite or infinite, and a minimum transfer duration coefficient $\zeta_{min}$ and a maximum transfer duration coefficient $\zeta_{max}$, comprises (a) computing, for each origin line L, and for each destination line L', a set of transfers T (L, L') between stations of the origin line and stations of the destination line such that the transfer time from the station of the origin line to the station of the destination line is less or equal to Δmax×$\zeta_{max}$; (b) determining, for each trip t of origin line L, and for each transfer (L@i→L'@j, Δ$\tau_{fp}$(L@i, L'@j)) in the transfer set T (L, L'), an earliest trip $t'_{min}$ of L' wherein the transfer is feasible with transfer duration coefficient $\zeta_{min}$, and an earliest trip $t'_{max}$ of L' wherein the transfer is feasible with transfer duration coefficient $\zeta_{max}$; (c) for each trip t' of [$t'_{min}$, $t'_{max}$], computing a maximum transfer duration coefficient $\sigma_{max}$ such that transfer t@i→t'@j is feasible; (d) adding transfer (t@i→t'@j, Δτ, $\sigma_{max}$) to a reduced set of transfers T (t, L') from trip t to trips of L' when the transfer (t@i→t'@j, Δτ, $\sigma_{max}$) is not dominated in the Pareto sense based on the criteria: destination trip t', which should be the lowest, origin trip index i, which should be the highest, destination trip index j, which should be the lowest, standard transfer time Δτ, which should be the lowest and maximum transfer duration coefficient $\sigma_{max}$, which should be the highest; and (e) removing transfers from the reduced set of feasible transfers T (t, L') if they are dominated in the Pareto sense based on the criteria: destination trip t', which should be the lowest, origin trip index i, which should be the highest, destination trip index j, which should be the lowest, standard transfer time Δτ, which should be the lowest, and maximum transfer duration coefficient $\sigma_{max}$, which should be the highest.

The method may further comprise (f) removing, before determining the earliest trip t' of L' wherein the transfer (t@i→t'@j, Δ$\tau_{fp}$(L@i, L'@i), $\sigma_{max}$) is feasible, a transfer (L@i→L'@j, Δ$\tau_{fp}$(L@i, L'@j)) from the reduced set of transfers T (L, L') when Δ$\tau_{fp}$(L@(i−1), L'@(j+1)) Δ$\tau_{fp}$(L@i, L'@j) and L@(i−1)=L'@(j+1).

The method may further comprise (f) pruning the reduced set of feasible transfers T (t)=$U_L$·T(t, L') based on a dominance relation for arrival time at stations and transfer duration coefficient at all stops reached by performing the transfers and by transferring from one of the reached stations to another station within Δmax×$\zeta_{max}$ such that a label (arr$_f$, arr$_v$, Δτ, $\sigma_{max}$) at a stop, with arr$_f$ the fixed part of the arrival time at the stop, arr$_v$ the variable part of the arrival time at the stop, Δτ the standard transfer duration and $\sigma_{max}$ the maximum transfer duration coefficient for which the transfer is feasible, is dominated by a label (arr'$_f$, arr'$_v$, Δτ', σ'$_{max}$) if $$\sigma'_{max} \leq \sigma_{max} \quad (1)$$

$$\Delta\tau' \leq \Delta\tau \quad (2)$$

$$\frac{arr'_f - arr_f}{\zeta_{min}} \leq arr_v - arr'_v. \quad (3)$$

The method may further comprise (f) computing at least one customized itinerary from a departure location to an arrival location based upon a user specified maximum transfer time lower than or equal to the system maximum transfer time Δmax and the maximum transfer duration coefficient chosen within a range [$\zeta_{min}$, $\zeta_{max}$] of possible values; the computing the at least one customized itinerary includes (f1) inputting, by a user, a user specified departure location, a user specified arrival location, a user specified departure time, a user specified transfer duration coefficient in the range [$\zeta_{min}$, $\zeta_{max}$], and a user specified maximum transfer time less or equal to the system maximum transfer duration Δmax; (f2) determining a set of possible initial trips as a set of pairs (trip t, station index i) such that the station t@i of the trip t is reachable from the origin location and trip t is the earliest trip of its line that can be boarded given the departure time and the displacement duration between the origin location and the station t@i; (f3) determining a set of possible final trips as a set of pairs (destination trip t, station index i) such that the arrival location is reachable from the station t@i; and (f4) performing a routing optimization algorithm so as to build, among itineraries having a main part from an initial trip belonging to the set of possible initial trips to a final trip belonging to the set of possible final trips, an itinerary, when considering only transfers from the reduced set of feasible transfers T (t)=$U_L$·T(t, L') such that the maximum transfer duration coefficient is greater than the user specified coefficient and the transfer duration is less than the user inputted maximum transfer time.

The routing optimization algorithm may compute a Pareto front according to earliest arrival time and minimum number of transfers.

The departure time inputted at (f1) may be replaced by a user inputted arrival time, the initial trips being defined at (f2) as the latest trips from the stations of which the destination can be reached before the user inputted arrival time, the final trips being defined at (f3) as the trips that can be reached from the destination, and the routing optimization algorithm computing the Pareto front according to latest departure time and minimum number of transfers performing a backward search.

The routing optimization algorithm may compute one optimal solution per element in the Pareto front.

A method for building a set of transfers between public transit trips based upon transfer times between stations, a set of possible transfer duration coefficients $\{\zeta_1, \zeta_2, \ldots \zeta_m\}$, comprises (a) computing, for each origin line L, and for each destination line L', a set of transfers T (L, L') between stations of the origin line and stations of the destination line such that the transfer time from the station of the origin line to the station of the destination line is defined; (b) determining, for each trip t of origin line L, and for each transfer (L@i→L'@j, $\Delta\tau$) in the transfer set T (L, L'), an earliest trip t'k of L' wherein the transfer is feasible for each possible transfer duration coefficient $\zeta_k$; (c) for each trip $t'_k$ of L' wherein t'k is the earliest trip of L' such that the transfer t@i→$t_k$@j is feasible for transfer duration coefficient $\zeta_k$, adding transfer (t@i→$t'_k$@j, $\Delta\tau_{fp}$(L@i, L'@j), $\zeta_k$) to reduced set of transfers T (t, L', k) from trip t to trips of L' for transfer duration coefficient $\zeta_k$ when transfer (t@i→$t'_k$@j, $\Delta\tau_{fp}$(L@i, L'@j), $\zeta_k$) is not dominated in the Pareto sense based on criteria: destination trip t', which should be the lowest, origin trip index i, which should be the highest, and destination trip index j, which should be the lowest; and (d) removing transfers from the reduced set of feasible transfers T (t, L', k) if they are dominated in the Pareto sense based on the criteria: destination trip t', which should be the lowest, origin trip index i, which should be the highest and destination trip index j, which should be the lowest.

The method may further comprise (e) removing, before determining the earliest trip t' of L' wherein the transfer (t@i→t'@j, $\Delta\tau$, $\zeta_k$) is feasible, a transfer (L@i →L'@j, $\Delta\tau$) from the reduced set of transfers T (L, L', k) for all k when $\Delta\tau_{fp}$(L@(i−1), L'@(j+1))≤$\Delta\tau_{fp}$(L@i, L @j) and L@(i−1)=L'@(j+1).

The sets T (t, L', k) may be computed in transfer duration coefficient increasing order and a next set of transfers is initialized containing a set for a previous transfer duration coefficient.

The method may further comprise (e) pruning transfer set T (t, k)=$U_L$T(t, L', k) of feasible transfers for transfer duration coefficient $\zeta_k$ based on arrival time at stations that should be minimal at all stops reached by performing the transfers and by transferring from one of the reached stations to another station.

The method may further comprise (e) computing at least one customized itinerary from a departure location to an arrival location based upon a user specified transfer duration coefficient chosen within the set of possible transfer duration coefficients $\{\zeta_1, \zeta_2, \ldots \zeta_m\}$, the computing the at least one customized itinerary includes (e1) inputting, by a user, a user specified departure location, a user specified arrival location, a user specified departure time, and a user specified transfer duration coefficient among the set $\{\zeta_1, \zeta_2, \ldots \zeta_m\}$, (e2) determining a set of possible initial trips as a set of pairs (trip t, station index i) such that the station t@i of the trip t is reachable from the origin location and trip t is the earliest trip of its line that can be boarded at its $i^{th}$ stop given the departure time and the displacement duration between the origin location and the station t@i, (e3) determining a set of possible final trips as a set of pairs (destination trip t, station index i) such that the arrival location is reachable from the station t@i, and (e4) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, k)=$U_L$T(t, L',k) such that the associated maximum transfer duration coefficient is greater than the user inputted transfer duration coefficient $\zeta_k$.

The routing optimization algorithm may compute a Pareto front according to earliest arrival time and minimum number of transfers.

The departure time inputted at (e1) may be replaced by a user inputted arrival time, the initial trips being defined at (e2) as the latest trips from the stations of which the destination can be reached before the user inputted arrival time, the final trips being defined at (e3) as the trips that can be reached from the destination, and the routing optimization algorithm computing the Pareto front according to latest departure time and minimum number of transfers performing a backward search.

The routing optimization algorithm may compute an optimal solution per element in the Pareto front.

A method for building a set of transfers between public transit trips based upon transfer times between stations, a set of possible transfer duration coefficients $\{\zeta_1, \zeta_2, \ldots \zeta_m\}$ and a system maximum transfer time $\Delta$max that can be finite or infinite, comprises (a) computing, for each origin line L, and for each destination line L', a set of transfers T (L, L') between stations of the origin line and stations of the destination line such that the transfer time from the station of the origin line to the station of the destination line is less or equal to $\Delta$max×$\zeta_{max}$; (b) determining, for each trip t of origin line L, and for each transfer (L@i→L'@j, $\Delta\tau$) in the transfer set T (L, L'), an earliest trip $t'_k$ of L' wherein the transfer is feasible for each possible transfer coefficient $\zeta_k$; (c) for each trip t'k of L' wherein $t'_k$ is the earliest trip of L' wherein the transfer t@i→t'k@j is feasible for transfer duration coefficient $\zeta_k$, adding transfer (t@i→t'k@j, $\Delta\tau$, $\zeta_k$) to reduced set of transfers T (t, L', k) from trip t to trips of L' for transfer duration coefficient $\zeta_k$ when transfer (t@i→$t'_k$@j, $\Delta\tau$, $\zeta_k$) is not dominated in a Pareto sense based on the criteria: destination trip t', which should be the lowest, origin trip index i, which should be the highest, destination trip index j, which should be the lowest, and standard transfer duration $\Delta\tau$, which should be the lowest; and (d) removing transfers from the reduced set of feasible transfers T (t, L', k) if they are dominated in the Pareto sense based on the criteria: destination trip t', which should be the lowest, origin trip index i, which should be the highest, destination trip index j, which should be the lowest, and standard transfer duration $\Delta\tau$, which should be the lowest.

The method may further comprise (e) removing, before determining the earliest trip t' of L' wherein the transfer (t@i→t'@j, $\Delta\tau$, $\zeta_k$) is feasible, a transfer (L@i→L'@j, $\Delta\tau_{fp}$(L@i, L'@j)) from the reduced set of transfers T (L, L', k) when $\Delta\tau_{fp}$(L@(i−1), L'@(j+1))≤$\Delta\tau_{fp}$(L@i, L @j) and L@(i−1)=L'@(j+1).

The sets T (t, L', k) may be computed in transfer duration coefficient increasing order and next set of transfers is initialized containing the set for the previous transfer duration coefficient.

The method may further comprise (e) pruning transfer set T (t, k)=$U_L$T(t, L', k) of feasible transfers for transfer duration coefficient $\zeta_k$ based on Pareto dominance for criteria arrival time at stations that should be the lowest and standard transfer duration that should be the lowest at all stops reached by performing the transfers and by transferring from one of the reached stations to another station.

The method may further comprise (e) computing at least one customized itinerary from a departure location to an arrival location based upon a user specified transfer duration coefficient chosen within a set of possible transfer duration coefficients $\{\zeta_1, \zeta_2, \ldots \zeta_m\}$, a user specified maximum transfer time lower than or equal to a system maximum transfer time $\Delta$max that can be finite or infinite; the computing at least one customized itinerary includes (e1) inputting, by a user, a user specified departure location, a user specified arrival location, a user specified departure time, a user specified transfer duration coefficient among the set $\{\zeta_1, \zeta_2, \ldots \zeta_m\}$ and a user specified maximum transfer duration lower than or equal to the system maximum transfer time $\Delta$max, (e2) determining a set of possible initial trips as a set of pairs (trip t, station index i) such that the station t@i of the trip t is reachable from the origin location and trip t is the earliest trip of its line that can be boarded at its $i^{th}$ stop given the departure time and the displacement duration between the origin location and the station t@i, (e3) determining a set of possible final trips as a set of pairs (destination trip t, station index i) such that the arrival location is reachable from the station t@i, and (e4) performing a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, k)=$U_L$T(t, L', k) such that the associated transfer duration coefficient is equal to the user inputted transfer duration coefficient $\zeta_k$ and the transfer duration, once applied the transfer duration coefficient, is lower than the user defined maximum transfer duration.

The routing optimization algorithm may compute a Pareto front for earliest arrival time and minimum number of transfers.

The departure time inputted at (e1) may be replaced by a user inputted arrival time, the initial trips being defined at (e2) as the latest trips from the stations of which the destination can be reached before the user inputted arrival time, the final trips being defined at (e3) as the trips that can be reached from the destination, and the routing optimization algorithm computing the Pareto front according to latest departure time and minimum number of transfers performing a backward search.

The routing optimization algorithm may compute one optimal solution per element in the Pareto front.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for building a reduced set of feasible transfers between public transit trips based upon transfer times between stations, and a system maximum transfer time $\Delta$max, to allow a user to select, at query time, a maximum transfer duration without impacting a processing time to generate possible itineraries, comprising:

(a) electronically computing, using an electronic processor and electronic memory, for each origin line L, and for each destination line L', a set of transfers T (L, L') between stations of the origin line and stations of the destination line such that the transfer time from the station of the origin line to the station of the destination line is lower than the system maximum transfer time $\Delta$max;

(b) electronically determining, using an electronic processor and electronic memory, for each trip t of origin line L, and for each transfer, a transfer being defined as (L@i→L'@j, $\Delta\tau_{fp}$(L@i, L'@j)), in the transfer set T (L, L'), an earliest trip t' of L', the earliest trip t' of L' being a trip that can be caught at j after $\tau_{arr}$(t,i)+$\Delta\tau_{fp}$(L@i, L'@j), L@i→L'@j defining a transfer between a stop (L@i) on origin line L of trip index i and a stop (L'@j) on line L' of trip index j, $\Delta\tau_{fp}$(L@i, L'@j)) defining a transfer duration associated with the displacement between the two stops, L@i and L'@j, the transfer (L@i→L'@j, $\Delta\tau_{fp}$(L@i, L'@j)) being feasible when an arrival time $\tau_{arr}$(t,i) at stop L@i plus the transfer duration $\Delta\tau_{fp}$(L@i, L'@j)) is less than or equal to a departure time $T_d$ep (t',j) at stop L'@j;

(c) electronically adding, using an electronic processor and electronic memory, the transfer (L@i→L'@j, $\Delta\tau_{fp}$(L@i, L'@j)) to a reduced set of feasible transfers T (t, L') from trip t of origin line L to trips of L' when the transfer (L@i→L'@j, $\Delta\tau_{fp}$(L@i, L'@j)) is not dominated in a Pareto sense based on criteria: highest origin trip index i, lowest destination trip index j, and lowest transfer duration $\Delta\tau_{fp}$(L@i, L'@j))

(d) electronically removing, using an electronic processor and electronic memory, transfers (L@i→L'@j, $\Delta\tau_{fp}$(L@i, L'@j)) from the reduced set of feasible transfers T (t, L') if the transfers (L@i→L'@j, $\Delta\tau_{fp}$(L@i, L'@j)) are dominated in the Pareto sense based on criteria: highest origin trip index i, lowest destination trip index j, and lowest transfer duration $\Delta\tau_{fp}$(L@i, L'@j);

(e) electronically receiving a user specified departure location, a user specified arrival location, a user specified departure time, and a user specified maximum transfer time that is lower than the system maximum transfer time $\Delta$max, the user specified maximum transfer time being a maximum amount of time that a user desires to take to get between two stations of different lines;

(f) electronically computing, using an electronic processor and electronic memory, at least one customized itinerary from a departure location to an arrival location based upon a user specified maximum transfer time that is lower than the system maximum transfer time $\Delta$max; and (g) electronically removing, using an electronic processor and electronic memory, before determining the earliest trip t' of L', the transfer (L@i→L'@j, $\Delta\tau_{fp}$(L@i, L'@j)) being feasible, a transfer (L@i→L'@j, $\Delta\tau_{fp}$(L@i, L'@j)) from the set of transfers T (L, L') when $\Delta\tau_{fp}$(L@(i−1), L'@(j+1)) $\Delta\tau_{fp}$(L@i, L'@j) and L@(i−1)=L'@(j+1), L@(i−1) being a stop before L@(i) on line L, L'@(j+1) being a stop after L'@(j) on line L';

said (f) computing the at least one customized itinerary electronically performing, using an electronic processor and electronic memory, a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, L') such that the transfer duration is less or equal to the user inputted maximum transfer time, the routing optimization algorithm electronically computing, using an electronic processor and electronic memory, a Pareto front according to criteria of an earliest arrival time and minimum number of transfers, the routing optimization algorithm electronically computing, using an electronic processor and electronic memory, one optimal solution per element in the Pareto front.

2. The method as claimed in claim 1, further comprising:
(h) electronically pruning, using an electronic processor and electronic memory, the reduced set of feasible transfers T (t, L') of feasible transfers based on Pareto dominance for criteria: lowest arrival time at stations, and lowest transfer duration $\tau_{rp}$(L@i, L'@j).

3. The method as claimed in claim 1, further comprising:
(h) electronically pruning, using an electronic processor and electronic memory, the reduced set of feasible transfer T (t, L') of feasible transfers based on Pareto dominance for criteria: lowest arrival time at stations, and lowest transfer duration $\Delta\tau_{fp}$(L@i, L'@j).

4. The method as claimed in claim 1, wherein said (f) electronically computing, using an electronic processor and electronic memory, the at least one customized itinerary includes,
(f1) determining a set of possible initial trips as a set of trip pairs, the set of trip pairs being defined as (trip t, station index i), such that a station, the station being defined as t@i, of the trip t is reachable from the departure location and trip t is the earliest trip of its line that can be boarded at its $i^{th}$ stop given the departure time and the displacement duration between the departure location and the station t@i, and
(f2) determining, a set of possible final trips as a set of destination trip pairs, the set of destination trip pairs being defined as (destination trip t, station index i) such that the arrival location is reachable from the station t@i.

5. The method as claimed in claim 4, wherein the inputted departure time is replaced by a user inputted arrival time, the initial trips being defined at (f2) as the latest trips from the stations of which the destination location can be reached before the user inputted arrival time, the final trips being defined at (f3) as the trips that can be reached from the destination, and the routing optimization algorithm electronically computing, using an electronic processor and electronic memory, the Pareto front according to latest departure time and minimum number of transfers performing a backward search.

6. A method for building a set of transfers between public transit trips based upon transfer times between stations, a minimum transfer duration coefficient $\zeta_{min}$ and a maximum transfer duration coefficient $\zeta_{max}$, to allow a user to select, at query time, a maximum transfer duration without impacting a processing time to generate possible itineraries, comprising:
(a) electronically computing, using an electronic processor and electronic memory, for each origin line L, and for each destination line L', a set of transfers T (L, L') between stations of the origin line and stations of the destination line such that the transfer time from the station of the origin line to the station of the destination line is defined;
(b) electronically determining, using an electronic processor and electronic memory, for each trip t of origin line L, and for each transfer, a transfer being defined as (L@i→L'@j, $\Delta\tau_{fp}$(L@i, L'@j), $\zeta$), in the transfer set T (L, L'), an earliest trip t'$_{min}$ of L', the earliest trip t'$_{min}$ of L' being a trip that can be caught at j after $\tau_{arr}$(t,i)+ $\Delta\tau_{fp}$(L@i, L'@i), $\zeta$ defining a transfer duration coefficient, L@i→L'@j defining a transfer between a stop (L@i) on origin line L of trip index i and a stop (L'@j) on line L' of trip index j, $\Delta\tau_{fp}$(L@i, L'@j)) defining a transfer duration associated with the displacement between the two stops, L@i and L'@j, the transfer (L@i→L'@j, $\Delta\tau_{fp}$(L@i, L'@j)) being feasible when an arrival time $\tau_{arr}$ (t,i) at stop L@i plus the transfer duration $\Delta\tau_{fp}$(L@i, L'@j)) is less than or equal to a departure time $\tau_{dep}$ (t',j) at stop L'@j, the transfer being feasible with the minimum transfer duration coefficient $\zeta_{min}$, and an earliest trip t'$_{max}$ of L', the transfer being feasible with the maximum transfer duration coefficient $\zeta_{max}$;
(c) for each trip t' of [t'$_{min}$, t'$_{max}$], electronically computing, using an electronic processor and electronic memory, the maximum transfer duration coefficient $\zeta_{max}$ such that the transfer L@i→L'@j is feasible;
(d) electronically adding, using an electronic processor and electronic memory, transfer (L@i→L'@j, $\Delta\tau_{fp}$(L@i, L'@j), $\zeta_{max}$) to a reduced set of transfers T (t, L') from trip t to trips of L' when the transfer (L@i→L'@j, $\Delta\tau_{fp}$(L@i, L'@j), $\zeta_{max}$) is not dominated in a Pareto sense based on criteria: highest origin trip index i, lowest destination trip index, and highest maximum transfer duration coefficient $\zeta_{max}$;
(e) electronically removing, using an electronic processor and electronic memory, transfers (L@i→L'@j, $\Delta\tau_{fp}$(L@i, L'@j), $\zeta_{max}$) from the reduced set of feasible transfers T (t, L') if the transfers (L@i→L'@j, $\Delta\tau_{fp}$(L@i, L'@j), $\zeta_{max}$) are dominated in the Pareto sense based on criteria: highest origin trip index i, lowest destination trip index j, and highest maximum transfer duration coefficient $\zeta_{max}$;
(f) electronically inputting, by a user, a user specified departure location, a user specified arrival location, a user specified departure time, and a user specified transfer duration coefficient in the interval [$\zeta_{min}$, $\zeta_{max}$], the user specified transfer duration coefficient being a speed that a user desires to take to get between two stations of different lines;
(g) electronically computing, using an electronic processor and electronic memory, at least one customized itinerary from a departure location to an arrival location, based on the minimum transfer duration coefficient $\zeta_{min}$ and the maximum transfer duration coefficient $\zeta_{max}$; and
(h) electronically removing, using an electronic processor and electronic memory, before determining the earliest trip t' of L', the transfer (L@i→L'@j, $\Delta\tau_{fp}$(L@i, L'@j), $\zeta_{max}$) being feasible, a transfer (L@i→L'@j, $\Delta\tau_{fp}$(L@i, L'@j), $\zeta$) from the reduced set of transfers T (L, L') when $\Delta\tau_{fp}$(L@(i-1), L'@(j+1)) $\Delta\tau_{fp}$(L@i, L'@j) and L@(i-1)=L'@(j+1), L@(i-1) being a stop before L@(i) on line L, L'@(j+1) being a stop after L'@(j) on line L';
said (g) computing the at least one customized itinerary electronically performing, using an electronic processor and electronic memory, a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, L'), the routing optimization algorithm electronically computing, using an electronic processor and electronic memory, a Pareto front according to criteria of an earliest arrival time and minimum number of transfers, the routing optimization algorithm electronically computing, using an electronic processor and electronic memory, one optimal solution per element in the Pareto front.

7. The method as claimed in claim 6, further comprising:
   (i) electronically pruning, using an electronic processor and electronic memory, the reduced set of transfers T (t, L') of feasible transfers based on a dominance relation for arrival time at stations and transfer duration coefficient at all stops.

8. The method as claimed in claim 6, further comprising:
   (i) electronically pruning, using an electronic processor and electronic memory, the reduced set of transfers T (t, L') of feasible transfers based on a dominance relation for arrival time at stations and transfer duration coefficient at all stops.

9. The method as claimed in claim 6 wherein said (g) electronically computing, using an electronic processor and electronic memory, the at least one customized itinerary includes,
   (g1) determining a set of possible initial trips as a set of trip pairs, the set of trip pairs being defined as (trip t, station index i) such that the station t@i of the trip t is reachable from the origin location and trip t is the earliest trip of its line that can be boarded given the departure time and the displacement duration between the origin location and the station t@i, and
   (g2) determining a set of possible final trips as a set of destination trip pairs, the set of destination trip pairs being defined as (destination trip t, station index i) such that the arrival location is reachable from the station t@i.

10. The method as claimed in claim 9, wherein the inputted departure time is replaced by a user inputted arrival time, the initial trips being defined at (g1) as the latest trips from the stations of which the destination can be reached before the user inputted arrival time, the final trips being defined at (g2) as the trips that can be reached from the destination, and the routing optimization algorithm electronically computing, using an electronic processor and electronic memory, the Pareto front according to latest departure time and minimum number of transfers performing a backward search.

11. A method for building a set of transfers between public transit trips based upon transfer times between stations, a system maximum transfer time $\Delta$max, a minimum transfer duration coefficient $\zeta_{min}$ and a maximum transfer duration coefficient $\zeta_{max}$, to allow a user to select, at query time, a maximum transfer duration without impacting a processing time to generate possible itineraries, comprising:
   (a) electronically computing, using an electronic processor and electronic memory, for each origin line L, and for each destination line L', a set of transfers T (L, L') between stations of the origin line and stations of the destination line such that the transfer time from the station of the origin line to the station of the destination line is less or equal to $\Delta$max$\times\zeta_{max}$;
   (b) electronically determining, using an electronic processor and electronic memory, for each trip t of origin line L, and for each transfer, a transfer being defined as (L@i→L'@j, $\Delta\tau_{fp}$(L@i, L'@j), $\zeta$), in the transfer set T (L, L'), an earliest trip t'$_{min}$ of L', the earliest trip t'$_{min}$ of L' being a trip that can be caught at j after $\tau_{arr}$(t,i)+ $\Delta\tau_{fp}$(L@i, L'@i), $\zeta$ defining a transfer duration coefficient, L@i→L'@j defining a transfer between a stop (L@i) on origin line L of trip index i and a stop (L'@j) on line L' of trip index j, $\Delta\tau_{fp}$(L@i, L'@j)) defining a transfer duration associated with the displacement between the two stops, L@i and L'@j, the transfer (L@i→L'@j, $\Delta\tau_{fp}$(L@i, L'@j)) being feasible when an arrival time $\tau_{arr}$ (t,i) at stop L@i plus the transfer duration $\Delta\tau_{fp}$(L@i, L'@j)) is less than or equal to a departure time T$_{dep}$ (t',j) at stop L'@j, the transfer being feasible with the minimum transfer duration coefficient $\zeta_{min}$, and an earliest trip t'$_{max}$ of L', the transfer being feasible with the maximum transfer duration coefficient $\zeta_{max}$;
   (c) for each trip t' of [t'$_{min}$, t'$_{max}$], electronically computing, using an electronic processor and electronic memory, the maximum transfer duration coefficient $\zeta_{max}$ such that the transfer L@i→L'@j is feasible;
   (d) electronically adding, using an electronic processor and electronic memory, transfer (L@i→L'@j, $\Delta\tau_{fp}$ (L@i, L'@j) $\zeta_{max}$) to a reduced set of transfers T (t, L') from trip t to trips of L' when the transfer ((L@i→L'@j, $\Delta\tau_{fp}$(L@i, L'@j), $\zeta_{max}$) is not dominated in a Pareto sense based on criteria: highest origin trip index i, lowest destination trip index j, lowest transfer duration $\Delta\tau_{fp}$(L@i, L'@j), and highest maximum transfer duration coefficient $\zeta_{max}$;
   (e) electronically removing, using an electronic processor and electronic memory, transfers (L@i→L'@j, $\Delta\tau_{fp}$ (L@i, L'@j), $\zeta_{max}$) from the reduced set of feasible transfers T (t, L') if the transfers (L@i→L'@j, $\Delta\tau_{fp}$ (L@i, L'@j), $\zeta_{max}$) are dominated in the Pareto sense based on criteria: highest origin trip index i, lowest destination trip index j, lowest transfer duration $\Delta\tau_{fp}$ (L@i, L'@j) and highest maximum transfer duration coefficient $\zeta_{max}$;
   (f) electronically inputting, by a user, a user specified departure location, a user specified arrival location, a user specified departure time, a user specified transfer duration coefficient in the range [$\zeta_{min}$, $\zeta_{max}$], and a user specified maximum transfer time less or equal to the system maximum transfer duration $\Delta$max, the user specified maximum transfer time being a maximum amount of time that a user desires to take to get between two stations of different lines;
   (g) electronically computing, using an electronic processor and electronic memory, at least one customized itinerary from a departure location to an arrival location based upon a user specified maximum transfer time lower than or equal to the system maximum transfer time $\Delta$max and the maximum transfer duration coefficient chosen within a range [$\zeta_{min}$, $\zeta_{max}$] of possible values; and
   (h) electronically removing, using an electronic processor and electronic memory, before determining the earliest trip t' of L', the transfer (L@i→L'@j, $\Delta\tau_{fp}$(L@i, L'@j), $\zeta_{max}$) being feasible, a transfer (L@i→L'@j, $\Delta\tau_{fp}$(L@i, L'@), $\zeta$) from the reduced set of transfers T (L, L') when $\Delta\tau_{fp}$(L@(i-1), L'@(j+1)) $\Delta\tau_{fp}$(L@i, L'@j) and L@(i-1)=L'@(j+1), L@(i-1) being a stop before L@(i) on line L, L'@(j+1) being a stop after L'@(j) on line L';
   said (g) computing the at least one customized itinerary electronically performing, using an electronic processor and electronic memory, a routing optimization algorithm so as to build, among itineraries having a main part from an initial trip belonging to the set of possible initial trips to a final trip belonging to the set of possible final trips, an itinerary, when considering only transfers from the reduced set of feasible transfers T (t, L') such that the maximum transfer duration coefficient is greater than the user specified coefficient and the transfer duration is less than the user inputted maximum transfer time, the routing optimization algorithm electronically computing a Pareto front according to earliest arrival time and minimum number of transfers, wherein the routing optimization algorithm electronically computing one optimal solution per element in the Pareto front.

12. The method as claimed in claim 11, further comprising:
   (i) electronically pruning the reduced set of feasible transfers T (t, L') based on a dominance relation for arrival time at stations and transfer duration coefficient at all stops.

13. The method as claimed in claim 11, further comprising:
   (i) electronically pruning the reduced set of feasible transfers T (t, L') based on a dominance relation for arrival time at stations and transfer duration coefficient at all stops.

14. The method as claimed in claim 11, wherein said (g) computing the at least one customized itinerary includes,
   (g1) determining a set of possible initial trips as a set of trip pairs, the set of trip pairs being defined as (trip t, station index i) such that the station t@i of the trip t is reachable from the origin location and trip t is the earliest trip of its line that can be boarded given the departure time and the displacement duration between the origin location and the station t@i; and
   (g2) determining a set of possible final trips as a set of destination trip pairs, the set of destination trip pairs being defined as (destination trip t, station index i) such that the arrival location is reachable from the station t@i.

15. The method as claimed in claim 14, wherein the inputted departure time is replaced by a user inputted arrival time, the initial trips being defined at (g1) as the latest trips from the stations of which the destination can be reached before the user inputted arrival time, the final trips being defined at (g2) as the trips that can be reached from the destination, and the routing optimization algorithm electronically computing, using an electronic processor and electronic memory, the Pareto front according to latest departure time and minimum number of transfers performing a backward search.

16. A method for building a set of transfers between public transit trips based upon transfer times between stations, a set of possible transfer duration coefficients $\{\zeta_1, \zeta_2, \ldots \zeta_m\}$, to allow a user to select, at query time, a maximum transfer duration without impacting a processing time to generate possible itineraries, comprising:
   (a) electronically computing, using an electronic processor and electronic memory, for each origin line L, and for each destination line L', a set of transfers T (L, L') between stations of the origin line and stations of the destination line such that the transfer time from the station of the origin line to the station of the destination line is defined;
   (b) electronically determining, using an electronic processor and electronic memory, for each trip t of origin line L, and for each transfer, a transfer being defined as (L@i→L'@j, $\Delta\tau$(L@i, L'@j), $\zeta_k$) in the transfer set T (L, L'), an earliest trip $t'_k$ of L', the earliest trip $t'_k$ of L' being a trip that can be caught at j after $\tau_{arr}(t,i)+\Delta\tau_{fp}$(L@i, L'@j), L@i→L'@j defining a transfer between a stop (L@i) on origin line L of trip index i and a stop (L'@j) on line L' of trip index j (L'@j), $\zeta_k$ defining a transfer duration coefficient, $\Delta\tau_{fp}$(L@i, L'@j)) defining a transfer duration associated with the displacement between the two stops, L@i and L'@j, the transfer (L@i→L'@j, $\Delta\tau_{fp}$(L@i, L'@j)) being feasible when an arrival time $\tau_{arr}$ (t,i) at stop L@i plus the transfer duration $\Delta\tau_{fp}$(L@i, L'@j)) is less than or equal to a departure time $T_d$ep (t',j) at stop L'@j, the transfer being feasible for each possible transfer duration coefficient $\zeta_k$;
   (c) for each trip $t'_k$ of L' wherein t'k is the earliest trip of L' such that the transfer L@i→L'@j is feasible for transfer duration coefficient $\zeta_k$, electronically adding, using an electronic processor and electronic memory, transfer (t@i→$t'_k$@j, $\Delta\tau_{fp}$(L@i, L'@j), $\zeta_k$) to a reduced set of transfers T (t, L', k) from trip t to trips of L' for transfer duration coefficient $\zeta_k$ when transfer (L@i→L'@j j, $\Delta\tau_{fp}$(L@i, L'@j), $\zeta_k$) is not dominated in a Pareto sense based on criteria: highest origin trip index i, and lowest destination trip index j;
   (d) electronically removing, using an electronic processor and electronic memory, transfers (L@i→L'@j, $\Delta\tau_{fp}$(L@i, L'@j), $\zeta_k$) from the reduced set of feasible transfers T (t, L', k) if the transfers (L@i→L'@j, $\Delta\tau_{fp}$(L@i, L'@j), $\zeta_k$) are dominated in the Pareto sense based on criteria: highest origin trip index i, and lowest destination trip index j;
   (e) electronically inputting, by a user, a user specified departure location, a user specified arrival location, a user specified departure time, and a user specified transfer duration coefficient among the set $\{\zeta_1, \zeta_2, \ldots \zeta_m\}$, the user specified transfer duration coefficient being a speed that a user desires to take to get between two stations of different lines;
   (f) electronically computing, using an electronic processor and electronic memory, at least one customized itinerary from a departure location to an arrival location based upon a user specified transfer duration coefficient chosen within the set of possible transfer duration coefficients $\{\zeta_1, \zeta_2, \ldots \zeta_m\}$; and
   (g) electronically removing, using an electronic processor and electronic memory, before determining the earliest trip t' of L' wherein the transfer (L@i→L'@j, $\Delta\tau_{fp}$(L@i, L'@j), $\zeta_k$) is feasible, a transfer (L@i→L'@j, $\Delta\tau_{fp}$(L@i, L'@j), $\zeta_k$) from the reduced set of transfers T (L, L', k) for all k when $\Delta\tau_{fp}$(L@(i-1), L'@(j+1)) $\Delta\tau_{fp}$(L@i, L'@j) and L@(i-1)=L'@(j+1), L@(i-1) being a stop before L@(i) on line L, L'@(j+1) being a stop after L'@(j) on line L';
   said (f) computing the at least one customized itinerary electronically performing, using an electronic processor and electronic memory, a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, L', k) such that the associated maximum transfer duration coefficient is greater than the user inputted transfer duration coefficient $\zeta_k$, the routing optimization algorithm electronically computing, using an electronic processor and electronic memory, a Pareto front according to earliest arrival time and minimum number of transfers, the routing optimization algorithm electronically computing, using an electronic processor and electronic memory, an optimal solution per element in the Pareto front.

17. The method as claimed in claim 16, wherein the reduced set of feasible transfers T (t, L', k) is computed in transfer duration coefficient increasing order and a next set of transfers is initialized containing a set for a previous transfer duration coefficient.

18. The method as claimed in claim 16, wherein the reduced set of feasible transfers T (t, L', k) is computed in transfer duration coefficient increasing order and a next set of transfers is initialized containing a set for a previous transfer duration coefficient.

19. The method as claimed in claim 16, further comprising:
   (h) electronically pruning, using an electronic processor and electronic memory, the reduced set of feasible transfers T (t, L', k) of feasible transfers for transfer duration coefficient $\zeta_k$ based on arrival time at stations that should be minimal at all stops.

20. The method as claimed in claim 16, further comprising:
   (h) electronically pruning, using an electronic processor and electronic memory, the reduced set of feasible transfers T (t, L', k) of feasible transfers for transfer duration coefficient $\zeta_k$ based on arrival time at stations that should be minimal at all stops.

21. The method as claimed in claim 17, further comprising:
   (h) electronically pruning, using an electronic processor and electronic memory, the reduced set of feasible transfers T (t, L', k) of feasible transfers for transfer duration coefficient $\zeta_k$ based on arrival time at stations that should be minimal at all stops.

22. The method as claimed in claim 16, wherein said (f) computing the at least one customized itinerary includes,
   (f1) determining a set of possible initial trips as a set of trip pairs, the set of trip pairs being defined as (trip t, station index i) such that the station t@i of the trip t is reachable from the origin location and trip t is the earliest trip of its line that can be boarded at its $i^{th}$ stop given the departure time and the displacement duration between the origin location and the station t@i, and
   (f2) determining a set of possible final trips as a set of destination trip pairs, the set of destination trip pairs being defined as (destination trip t, station index i) such that the arrival location is reachable from the station t@i.

23. The method as claimed in claim 22, wherein the inputted departure time is replaced by a user inputted arrival time, the initial trips being defined at (f1) as the latest trips from the stations of which the destination can be reached before the user inputted arrival time, the final trips being defined at (f2) as the trips that can be reached from the destination, and the routing optimization algorithm electronically computing, using an electronic processor and electronic memory, the Pareto front according to latest departure time and minimum number of transfers performing a backward search.

24. A method for building a set of transfers between public transit trips based upon transfer times between stations, a set of possible transfer duration coefficients $\{\zeta_1, \zeta_2, \ldots \zeta_m\}$ and a system maximum transfer time $\Delta$max, to allow a user to select, at query time, a maximum transfer duration without impacting a processing time to generate possible itineraries, comprising:
   (a) electronically computing, using an electronic processor and electronic memory, for each origin line L, and for each destination line L', a set of transfers T (L, L') between stations of the origin line and stations of the destination line such that the transfer time from the station of the origin line to the station of the destination line is less or equal to $\Delta$max$\times\zeta_{max}$;
   (b) electronically determining, using an electronic processor and electronic memory, for each trip t of origin line L, and for each transfer, a transfer being defined as (L@i→L'@j, $\Delta\tau_{fp}$(L@i, L'@j), $\zeta_k$), in the transfer set T (L, L'), an earliest trip t'$_k$ of L', the earliest trip t'$_k$ of L' being a trip that can be caught at j after $\tau_{arr}$(t,i)+$\Delta\tau_{fp}$(L@i, L'@j), $\zeta_k$ defining a transfer duration coefficient, L@i→L'@j defining a transfer between a stop (L@i) on origin line L of trip index i and a stop (L'@j) on line L' of trip index j, $\Delta\tau_{fp}$(L@i, L'@j)) defining a transfer duration associated with the displacement between the two stops, L@i and L'@j, the transfer (L@i→L'@j, $\Delta\tau_{fp}$(L@i, L'@j)) being feasible when an arrival time $\tau_{arr}$ (t,i) at stop L@i plus the transfer duration $\Delta\tau_{fp}$ (L@i, L'@j)) is less than or equal to a departure time T$_{dep}$ (t',j) at stop L'@j, the transfer being feasible for each possible transfer coefficient $\zeta_k$;
   (c) for each trip t'$_k$ of L', t'$_k$ being the earliest trip of L', the transfer t@i→t'k@j being feasible for transfer duration coefficient $\zeta_k$, electronically adding, using an electronic processor and electronic memory, transfer (L@i→L'@j, $\Delta\tau_{fp}$(L@i, L'@), $\zeta_k$) to a reduced set of transfers T (t, L', k) from trip t to trips of L' for transfer duration coefficient $\zeta_k$ when transfer (L@i→L'@j, $\Delta\tau_{fp}$(L@i, L'@j), $\zeta_k$) is not dominated in a Pareto sense based on criteria: highest origin trip index i, lowest destination trip index j, and lowest standard transfer duration $\Delta\tau_{fp}$(L@i, L'@j);
   (d) electronically removing, using an electronic processor and electronic memory, transfers (L@i→L'@j, $\Delta\tau_{fp}$(L@i, L'@j), $\zeta_k$) from the reduced set of feasible transfers T (t, L', k) if the transfers (L@i→L'@j, $\Delta\tau_{fp}$(L@i, L'@j), $\zeta_k$) are dominated in the Pareto sense based on criteria: highest origin trip index i, lowest destination trip index j and lowest standard transfer duration $\Delta\tau_{fp}$(L@i, L'@j);
   (e) electronically inputting, by a user, a user specified departure location, a user specified arrival location, a user specified departure time, a user specified transfer duration coefficient among the set $\{\zeta_1, \zeta_2, \ldots \zeta_m\}$ and a user specified maximum transfer duration lower than or equal to the system maximum transfer time $\Delta$max, the user specified maximum transfer duration being a maximum amount of time that a user desires to take to get between two stations of different lines;
   (f) electronically computing, using an electronic processor and electronic memory, at least one customized itinerary from a departure location to an arrival location based upon a user specified transfer duration coefficient chosen within a set of possible transfer duration coefficients $\{\zeta_1, \zeta_2, \ldots \zeta_m\}$, a user specified maximum transfer time lower than or equal to a system maximum transfer time $\Delta$max; and
   (g) electronically removing, using an electronic processor and electronic memory, before determining the earliest trip t' of L' wherein the transfer (L@i→L'@j, $\Delta\tau_{fp}$(L@i, L'@j), $\zeta_k$) is feasible, a transfer (L@i→L'@j, $\Delta\tau_{fp}$(L@i, L'@f), $\zeta_k$) from the reduced set of transfers T (L, L', k) when $\Delta\tau_{fp}$(L@(i−1), L'@(j+1)) $\Delta\tau_{fp}$(L@i, L'@j) and L@(i−1)=L'@(j+1), L@(i−1) being a stop before L@(i) on line L, L'@(j+1) being a stop after L'@(j) on line L';
   said (f) computing at least one customized itinerary electronically performing, using an electronic processor and electronic memory, a routing optimization algorithm so as to build, among itineraries having a main part from an initial trip belonging to the set of possible initial trips to a final trip belonging to the set of possible final trips, at least one itinerary, when considering only transfers from the reduced set of feasible transfers T (t, L', k) such that the associated transfer duration coefficient is equal to the user inputted transfer duration coefficient $\zeta_k$ and the transfer duration, once applied the transfer duration coefficient, is lower than the user defined maximum transfer duration, the routing optimization algorithm electronically computing, using an electronic processor and electronic memory, a Pareto front for earliest arrival time and minimum number of transfers, the routing optimization algorithm electronically computing, using an electronic processor and electronic memory, one optimal solution per element in the Pareto front.

25. The method as claimed in claim 24, wherein the reduced set of feasible transfers T (t, L', k) is computed in transfer duration coefficient increasing order and next set of transfers is initialized containing the set for the previous transfer duration coefficient.

26. The method as claimed in claim 24, further comprising:
(h) electronically pruning, using an electronic processor and electronic memory, the reduced set of feasible transfers T (t, L', k) of feasible transfers for transfer duration coefficient $\zeta_k$ based on Pareto dominance for criteria arrival time at stations that should be the lowest and standard transfer duration that should be the lowest at all stops.

27. The method as claimed in claim 24, further comprising:
(h) electronically pruning, using an electronic processor and electronic memory, the reduced set of feasible transfers T (t, L', k) of feasible transfers for transfer duration coefficient $\zeta_k$ based on Pareto dominance for criteria arrival time at stations that should be the lowest and standard transfer duration that should be the lowest at all stops.

28. The method as claimed in claim 25, further comprising:
(h) electronically pruning, using an electronic processor and electronic memory, transfer set T (t, k)=$\cup_L$,T(t, L', k) of feasible transfers for transfer duration coefficient $\zeta_k$ based on Pareto dominance for criteria arrival time at stations that should be the lowest and standard transfer duration that should be the lowest at all stops.

29. The method as claimed in claim 26, further comprising:
(i) electronically pruning, using an electronic processor and electronic memory, the reduced set of feasible transfers T (t, L', k) of feasible transfers for transfer duration coefficient $\zeta_k$ based on Pareto dominance for criteria arrival time at stations that should be the lowest and standard transfer duration that should be the lowest at all stops.

30. The method as claimed in claim 24, wherein said (f) computing at least one customized itinerary includes,
(f1) determining a set of possible initial trips as a set of trip pairs, the set of trip pairs being defined as (trip t, station index i) such that the station t@i of the trip t is reachable from the origin location and trip t is the earliest trip of its line that can be boarded at its $i^{th}$ stop given the departure time and the displacement duration between the origin location and the station t@i, and
(f2) determining a set of possible final trips as a set of destination trip pairs, the set of destination trip pairs being defined as (destination trip t, station index i) such that the arrival location is reachable from the station t@i.

31. The method as claimed in claim 30, wherein the inputted departure time is replaced by a user inputted arrival time, the initial trips being defined at (f1) as the latest trips from the stations of which the destination can be reached before the user inputted arrival time, the final trips being defined at (f2) as the trips that can be reached from the destination, and the routing optimization algorithm electronically computing, using an electronic processor and electronic memory, the Pareto front according to latest departure time and minimum number of transfers performing a backward search.

* * * * *